(12) United States Patent
Bode et al.

(10) Patent No.: US 6,497,634 B1
(45) Date of Patent: Dec. 24, 2002

(54) INFINITELY VARIABLE EPICYCLIC TRANSMISSIONS

(75) Inventors: John R. Bode, Albuquerque, NM (US); A. Keith Miller, Albuquerque, NM (US); Mark R. Vaughn, Albuquerque, NM (US)

(73) Assignee: Veritran, Inc., Albuquerque, NM (US)

( * ) Notice: Subject to any disclaimer, the term of this patent is extended or adjusted under 35 U.S.C. 154(b) by 0 days.

(21) Appl. No.: 09/762,352

(22) PCT Filed: Aug. 5, 1999

(86) PCT No.: PCT/US99/17725

§ 371 (c)(1),
(2), (4) Date: May 3, 2001

(87) PCT Pub. No.: WO00/11371

PCT Pub. Date: Mar. 2, 2000

Related U.S. Application Data
(60) Provisional application No. 60/095,596, filed on Aug. 6, 1998.

(51) Int. Cl.[7] .............................. F16H 37/02; F16H 7/00
(52) U.S. Cl. ...................... 475/211; 475/218; 475/339; 474/139
(58) Field of Search ................................. 475/211, 218, 475/302, 339; 474/72, 77, 139

(56) References Cited

U.S. PATENT DOCUMENTS

| | | | |
|---|---|---|---|
| 1,445,741 A | 2/1923 | Blackwell | |
| 1,981,582 A | 11/1934 | Colucci | |
| 2,745,297 A | 5/1956 | Andrus | |
| 2,755,683 A | 7/1956 | Ryan | |
| 3,251,243 A | 5/1966 | Kress | |
| 3,503,279 A | 3/1970 | Sievert et al. | |
| 3,529,493 A | 9/1970 | Egli | |
| 3,720,113 A | 3/1973 | Doorne et al. | |
| 3,861,485 A | 1/1975 | Busch | |
| 3,944,253 A | 3/1976 | Ripley, III | |
| 4,026,166 A | 5/1977 | Jackson | |
| 4,116,083 A | 9/1978 | Gogins | |
| 4,194,417 A | 3/1980 | Kato et al. | |
| 4,290,320 A | 9/1981 | Abbott | |
| 4,333,555 A | 6/1982 | Gogins | |
| 4,392,394 A | 7/1983 | Hofbauer et al. | |
| 4,546,673 A | 10/1985 | Shigematsu et al. | |

(List continued on next page.)

FOREIGN PATENT DOCUMENTS

| | | | | |
|---|---|---|---|---|
| DE | 29 37 827 A1 | 4/1981 | | |
| DE | 3600627 C1 | 6/1987 | | |
| EP | 0061575 | * 10/1982 | | 475/211 |
| FR | 1529641 | 6/1968 | | |
| GB | 2086496 | * 5/1982 | | 475/211 |

OTHER PUBLICATIONS

Hatheway, Mary, "Unique transmission could revolutionize car industry", *Sandia Lab News,* Oct. 13, 1995, vol. 47, No. 21, Sandia National Laboratories, Albuquerque, New Mexico.

Stavnicky, L., "Infinitely Variable Transmission", *Design Dimensions,* Aug., 1995.

Fitz, F.A., et al., "A Geared Infinitely Variable Transmission for Automotive Applications", *Society of Automotive Engineers,* 1991, No. 910407, pp. 1–7.

*Primary Examiner*—Charles A. Marmor
*Assistant Examiner*—Ha Ho
(74) *Attorney, Agent, or Firm*—Rod D. Baker

(57) ABSTRACT

An infinite variable transmission with input shaft (52), planetary carrier (28), planetary pulleys (36) and planetary gears (32) with planetary axles (30) equiangularly disposed on the carrier (28). Variable pitch pulley (41) adjust a serpentine belt (38) which adjust the rotation of the planetary gears (32) to adjust the output shaft (20).

10 Claims, 11 Drawing Sheets

U.S. PATENT DOCUMENTS

| | | |
|---|---|---|
| 4,567,789 A | 2/1986 | Wilkes |
| 4,599,916 A | 7/1986 | Hirosawa |
| 4,632,702 A | 12/1986 | DiGiambattista |
| 4,644,820 A | 2/1987 | Macey et al. |
| 4,672,861 A | 6/1987 | Lanzer |
| 4,705,518 A | 11/1987 | Moroto et al. |
| 4,885,955 A | 12/1989 | Kraus |
| 4,890,513 A | 1/1990 | Way, Jr. |
| 4,913,003 A * | 4/1990 | Tervola ................. 475/211 |
| 4,936,155 A | 6/1990 | Gogins |
| 4,990,127 A * | 2/1991 | Roberts et al. ............ 475/211 |
| 5,121,936 A | 6/1992 | Cowan |
| 5,167,591 A * | 12/1992 | Cowan ................. 475/211 |
| 5,194,049 A | 3/1993 | Knop, Jr. |
| 5,215,323 A | 6/1993 | Cowan |
| 5,334,115 A | 8/1994 | Pires |
| 5,360,380 A | 11/1994 | Nottle |
| 5,392,664 A | 2/1995 | Gogins |
| 5,396,768 A | 3/1995 | Zulu |
| 5,433,675 A | 7/1995 | Kraus |
| 5,624,015 A | 4/1997 | Johnson |
| 5,632,703 A | 5/1997 | Wilkes et al. |
| 5,827,146 A * | 10/1998 | Yan et al. ................. 475/211 |

* cited by examiner

INFINITELY VARIABLE EPICYCLIC TRANSMISSIONS

CROSS-REFERENCE TO RELATED APPLICATIONS

This application claims the benefit of the filing of U.S. Provisional Patent Application Serial No. 60/095,596, entitled "Continuously Variable Transmission", filed on Aug. 6, 1998, and the specification thereof is incorporated herein by reference.

BACKGROUND OF THE INVENTION

1. Field of the Invention

The invention is generally concerned with power transmissions, particularly continuously variable transmissions, and more specifically transmissions for use in rotational machines requiring continuous, infinitely adjustable output speed and output torque while maintaining nearly constant rotational speed of the input prime mover.

2. Background Art

A continuously variable transmission suitable for automotive applications has been sought for nearly a century. It has even longer been recognized that pedal-driven vehicles would operate most efficiently if the propulsive ground wheel rotational speed were varied such that the input pedal rotational speed remains nearly constant, independent of the incline of the path. Tools designed to remove material in a manufacturing process (lathes, drills, mills, routers, and the like) often benefit from precise selection of the tool speed at the interface with the workpiece. For cost and power efficiency reasons, such tools typically are powered by synchronous electric motors. Both machine power sources (such as electric motors or internal combustion engines) and human propulsion operate most efficiently at fixed rotational speeds or within a limited range; however, the final application of the driving power usually requires a different or broader range of speeds. For all applications, whether for machine powered equipment or human powered vehicles, a transmission device combining the desirable characteristics of high torque capacity, high efficiency, compact size, light weight and competitive manufacturing cost has yet to be achieved.

3. Background Art

Currently, speed adjustment is normally accomplished by the use of control devices incorporating numerous selective discrete fixed ratio elements (usually gears).

Continuously variable speed control systems (transmissions) are an alternative means for speed adjustment, but tend to occupy large volumes, are heavy, often use some sort of belt system to adjust the speed, or use complicated ratchet and overriding clutch mechanisms. Most known continuous speed control systems offer the capability of producing adjustable speed in only one direction and require a clutch to uncouple the prime mover from the output. Generally, all known variable speed control systems have limited power transfer capabilities.

High power applications, usually involving a limited range of speed variation, such as in construction and agricultural equipment, are currently obtained using hydrostatic drives operating in low flow, high fluid pressure regimes, or hydraulic torque converters operating in high fluid flow, low pressure conditions, or limited slip differential transmissions, all of which suffer significant energy loss. Continuously variable transmissions have yet to be suitably integrated into high-speed/high-power applications such as standard motor vehicles. Continuously variable transmissions to date have yet to exceed the approximately 150 hp rating.

Infinitely Variable Versus Continuously Variable Transmission

Several devices have been proposed for achieving continuously variable output speed, some of which include infinitely variation capability. A "continuously variable" transmission is a transmission in which the ratio of output rotation speed to input rotation speed can be varied continuously from a first value to a second value, both values having the same algebraic sign. A continuously variable transmission may also include a discrete, usually separately actuated, reverse gear—having an algebraic sign different from the first and second value. An "infinitely variable" transmission is a transmission in which the ratio of output rotation speed to input rotation speed can be varied continuously from a first value to a second value—where the first and second values can have different algebraic signs. Thus, the "infinitely variable" transmission includes the "infinite" condition where the ratio of the input rotation speed to the output rotation speed is indeterminate, i.e., infinite. Thus "infinitely variable" transmissions may be characterized as a subset class of "continuously variable" transmissions, in that both classes have the capability to continuously control output speeds with generally fixed input rotational speed. However, infinitely variable transmissions offer a broader range of capability and applications due to their ability to drive output speeds to nearly zero while theoretically producing output torques approaching an infinite condition, limited only by the slip or load carrying capabilities of internal components.

Classes of Continuously/Infinitely Variable Transmissions

Both continuously variable and infinitely variable transmissions can be classified into five types.

The first type, which is the oldest and probably most extensively employed, includes two variable pitch pulleys connected by a belt with provision for varying the diameters of the pulleys and thus the speed ratio. While such devices are efficient, they characteristically are high in volume and weight, and have a limited range of speed variation. There have been at least two major improved variants to this basic dual variable pitch pulley concept. The power-limiting component in this design typically is either the belt reaching the limit of its tensile strength, or the friction between the belt and the pulley of smaller diameter. In a device disclosed in U.S. Pat. No. 3,720,113 to Van Dorne, the belt is changed from transferring torque via tension to transferring torque via compression. In the Van Dorne device, compression links are carried by a series of thin bands, the links conforming to each other to form a semi-rigid bar between the two variable pitch pulleys. The failure mode for the endless belt is changed from a tensile failure to one of buckling instability of the links, or material compression failure, both of which potentially allow a greater load than can be achieved by a tensile member. However, the speed adjustment range is limited.

A second major variant has been termed the Positive Infinitely Variable (PIV) variable speed drive used routinely in industrial applications. Within the definition used in this disclosure, the PIV is a misnomer because the speed control devices do not have a speed range where the output can be continuously varied to a negative algebraic sign. A feature of the PIV is the replacement of the belt by an endless chain, each link of the chain containing a series of transverse conforming rods that engage the edges of pulleys containing radial groves in the contact faces. This design eliminates slip between the endless belt-like member that transfers the torque and the mating variable pulley. While a speed variation range of as high as 6 is reported for such devices, the power ratings typically are below 30 hp.

A second type of continuously variable transmission includes single contact traction or friction drives using various schemes which rely on metal-to-metal rolling contact friction, sometimes using lubricant shear as the traction mechanism. Examples of such devices include cone on cone devices wherein two cones each of equal and opposite pitch are mated to contact at single points but in such a way that the summed circumference of the combined assembly is constant. Examples and variants of this type are shown in U.S. Pat. No. 4,392,394 to Hofbauer and U.S. Pat. No. 5,433,675 to Kraus.

Another example of continuously variable transmission is the ball and disc type. In this class of drive mechanism, the rotational axis for a ball element is usually at a substantially right angle to the rotational axis of a disc element. The ball element, which is constrained to have a surface of rotation, is positioned so that when it is pressed against the rotating disc element, the ball element is driven by the disc. By moving the ball element along a radius of the disc element, a variable speed drive can be obtained from the ball element. The efficiency of such mechanisms is highly dependent on the quality of contact between the two traction elements, the cleanness of the surfaces, and degree of wear of each of the elements. While substantial speed variation can be achieved, such devices a typically limited to sub-horsepower ratings, and are difficult to maintain.

The third type of continuously adjustable speed devices are hydraulic drives, typically driving hydraulic motors using variable displacement pumps. Such devices are termed hydrostatic drives because they operate at high fluid pressures, but with low displacement. Other variable speed hydraulic drives combine both gear sets and the hydrodrive mechanism to allow for infinitely variable capability. Examples are disclosed in the U.S. Pat. No. 5,624,015 to Johnson and U.S. Pat. No. 5,396,768 to Zulu. Such devices have proven reliable in high power and high torque applications, but at the cost of very low efficiency.

The fourth type of continuously variable speed control is in the general category of ratcheting drives. Such drives, as taught for example by Pires (U.S. Pat. No. 5,1334,115), Gogins (U.S. Pat. Nos. 4,116,083, 4,194,417, 4,333,555, 4,936,155, and 5,392,664), and Mills (U.S. Pat. No. 5,632, 702) are all characterized as completely mechanical and function by generating variable amplitude oscillation by positioning control rings or cams eccentrically to the input drive. Generally a plurality of eccentric positions are used for a single revolution of the input shaft with connecting arms transferring forward portion of the oscillating motion generated in each arm to an output gear through over riding clutches, or other mechanical diode devices. To reduce output torque ripple, such devices typically use an increasing number of oscillating elements, and auxiliary linkages to smooth the rectified motion to an acceptable level for a given application.

The inventions described and claimed herein fall generally within a broad, fifth type of continuously variable speed control mechanism generally characterized by the use of one or more epicyclical gear arrangements. Some known devices of this type contain elements of both the ratcheting drive and epicyclical control, for example the device of U.S. Pat. No. 5,334,115 to Pires. The common element of control in this type of transmission is the unique motions associated with epicyclic systems. One significant distinction between the present invention and various known versions of this category of transmissions is the manner in which the output motion is connected to the input, and the means by which rotary force is imparted to each of the epicyclic components. Also of note in any particular version is whether and how the planetary carrier (spider), the planetary assemblies, the encircling ring gear, the sun gear, or auxiliary "moon" gears that attach and circulate about a portion of the circumference of planetary assemblies, interact. Many of the known devices rely on some type of friction device to create a change of speed that is then amplified, or smoothed by the epicyclic system.

By way of example, the following United States Patents describe various epicyclical type systems: U.S. Pat. No. 4,567,789 to Wilkes; U.S. Pat. No. 5,632,703 to Wilkes et al.; U.S. Pat. No. 1,445,741 to Blackwell; U.S. Pat. No. 2,745,297 to Andrus; U.S. Pat. No. 2,755,683 to Ryan; U.S. Pat. No. 3,251,243 to Kress; U.S. Pat. No. 3,503,279 to Sievert et al.; U.S. Pat. No. 3,861,485 to Busch; U.S. Pat. No. 4,599,916 to Hirosawa; U.S. Pat. No. 4,546,673 to Shigematsu; U.S. Pat. No. 4,644,820 to Macey et al.; U.S. Pat. No. 4,672,861 to Lanzer, U.S. Pat. No. 5,215,323 to Cowan; U.S. Pat. No. 3,944,253 to Ripley; U.S. Pat. No. 5,121,936 to Smirl; and U.S. Pat. No. 4,706,518 to Moroto. An epicyclical speed reduction mechanism has been described in U.S. Pat. No. 5,360,380 to Nottle, that purportedly produces variable output speed without using variable pulley belt drives or friction devices.

SUMMARY OF THE INVENTION

Several embodiments of the invention are described in this application. These are all capable of continuously varying the output speed and torque through forward, neutral, and reverse while the input shaft remains constant in rotational speed and direction. Each of the devices share: 1) the highly desirable features of compactness of both width and diameter; 2) use of efficient epicyclic gear components to achieve the infinitely variable gear-ratio feature; 3) integral features allowing for direct, independent speed control of the planetary elements driven from the input shaft; 4) coaxially aligned input and output shafts; and 5) a relatively small number of components for inexpensive, reliable manufacture.

The primary difference among the embodiments herein is in the means by which the independent speed control of the planetary gears is achieved, for which three principal means are presented. The first means is a serpentine belt or chain mechanism where the planetary gears are powered directly via belt pulleys or chain sprockets and an endless belt or chain is configured in a serpentine arrangement around three planetary drive pulleys and a central, rotationally fixed variable pitch pulley member. The chain drive permits significantly higher torque applications than the endless belt version, but is not continuously adjustable (rather is incrementally adjustable to integer values of the chain pitch). Central to the chain drive is a mechanical iris pulley member that can expand or contract to various diameters corresponding to the integer incremental values of the chain pitch, supporting an adjustment chain or beaded interface band in traction with the drive chain, and a mechanism for extension and retraction of the adjustment chain or beaded interface band. In this description and in the claims, a beaded interface band is functionally equivalent to a linked chain to serve as an adjustment chain.

The second means relies neither on belts nor chains for speed control, employing instead a set of tapered split races, coaxially aligned with the input and output shafts, that provide traction and position control to rollers mounted on swing arms coaxially aligned with each of the planetary gears and attached to the planetary carrier. Control means are provided to move the split tapered races relative to each other in axial extent which, by means of mating rollers and planetary moon gears meshed with each planetary, controls the speed of the planetary gears. The design allows for very high torques to be transferred to the output shaft throughout a wide range of speed variation by virtue of the addition of more swing arms and planetary elements providing for multiple points of engagement between rollers and races, as well as the positioning of the arms so that self locking between the rollers and races occurs as the output torque increases.

The third means combines the power from two prime movers of which one or both have speed adjustment capability. This dual input design allows for coaxial alignment of the input shaft from one of the prime movers with the output shaft, but requires the input from the second prime mover to be offset.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED
EMBODIMENTS (BEST MODES FOR
CARRYING OUT THE INVENTION)

The invention has several desirable embodiments. All the embodiments offer the advantage of being simple, compact, and reliable. All embodiments are capable of continuously varying the output speed and torque through forward, neutral, and reverse while the input shaft remains constant in rotational speed and direction. Among other features shared by the various embodiments are compactness of both width and diameter; use of efficient epicyclic gear components to achieve an infinitely variable gear ratio, integral components allowing for direct, independent speed control of the planetary elements driven from the input shaft, coaxially aligned input and output shafts, and relatively small number of components for inexpensive, reliable manufacture. The inventive apparatus features independent control of various components of epicyclical gear systems to achieve output speeds that may be selectively varied continuously from forward, through neutral, and then into reverse (and vice versa). Due to simplicity, compactness, and high torque capability, the invention disclosed herein has many applications not immediately available with other continuously variable transmissions.

Figure 1:
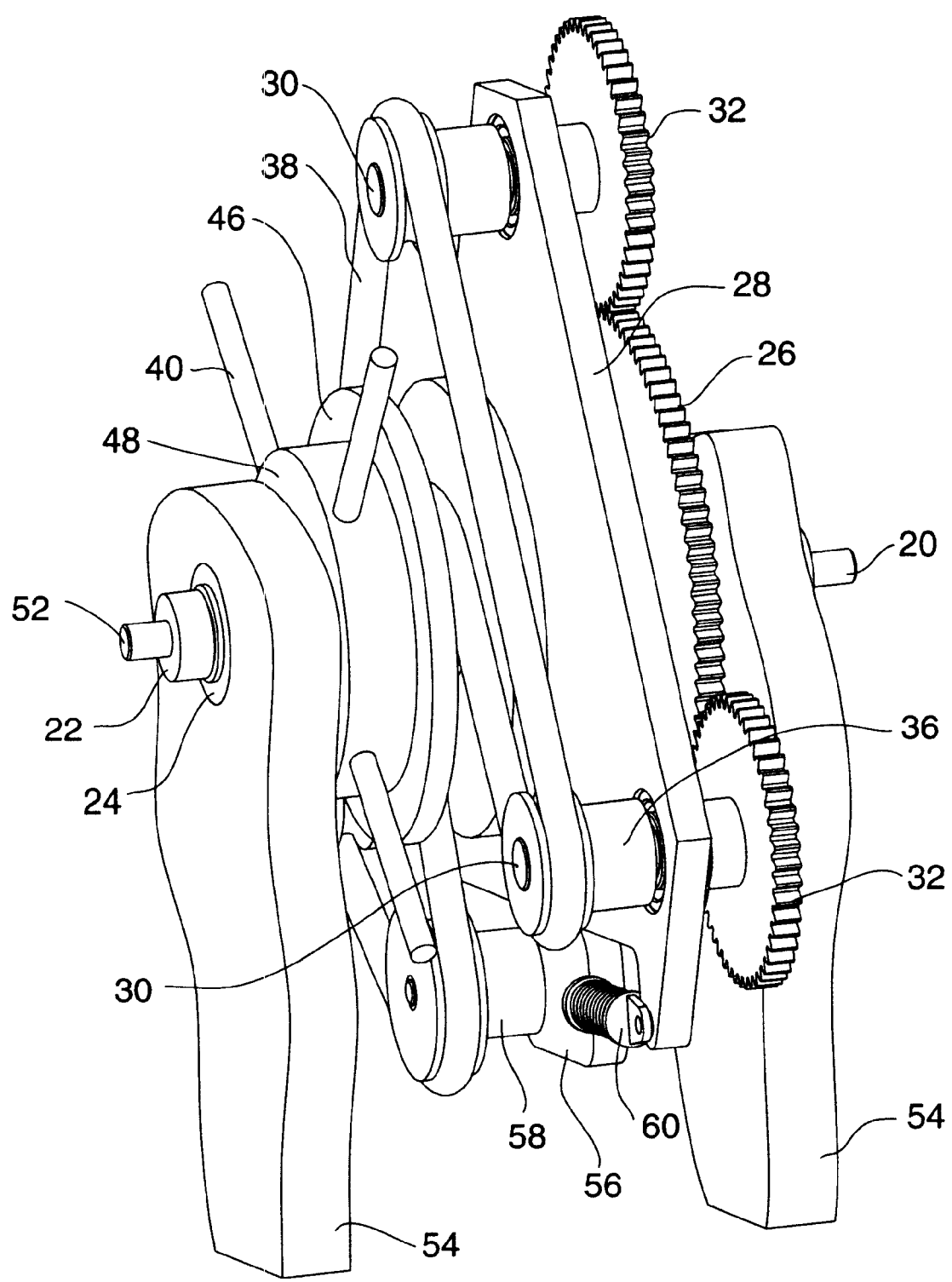
FIG. 1 is a perspective view of a first embodiment of the apparatus of the invention, showing the use of an endless serpentine belt and variable pitch pulley as components by which the independent speed control is achieved.
Figure 2:
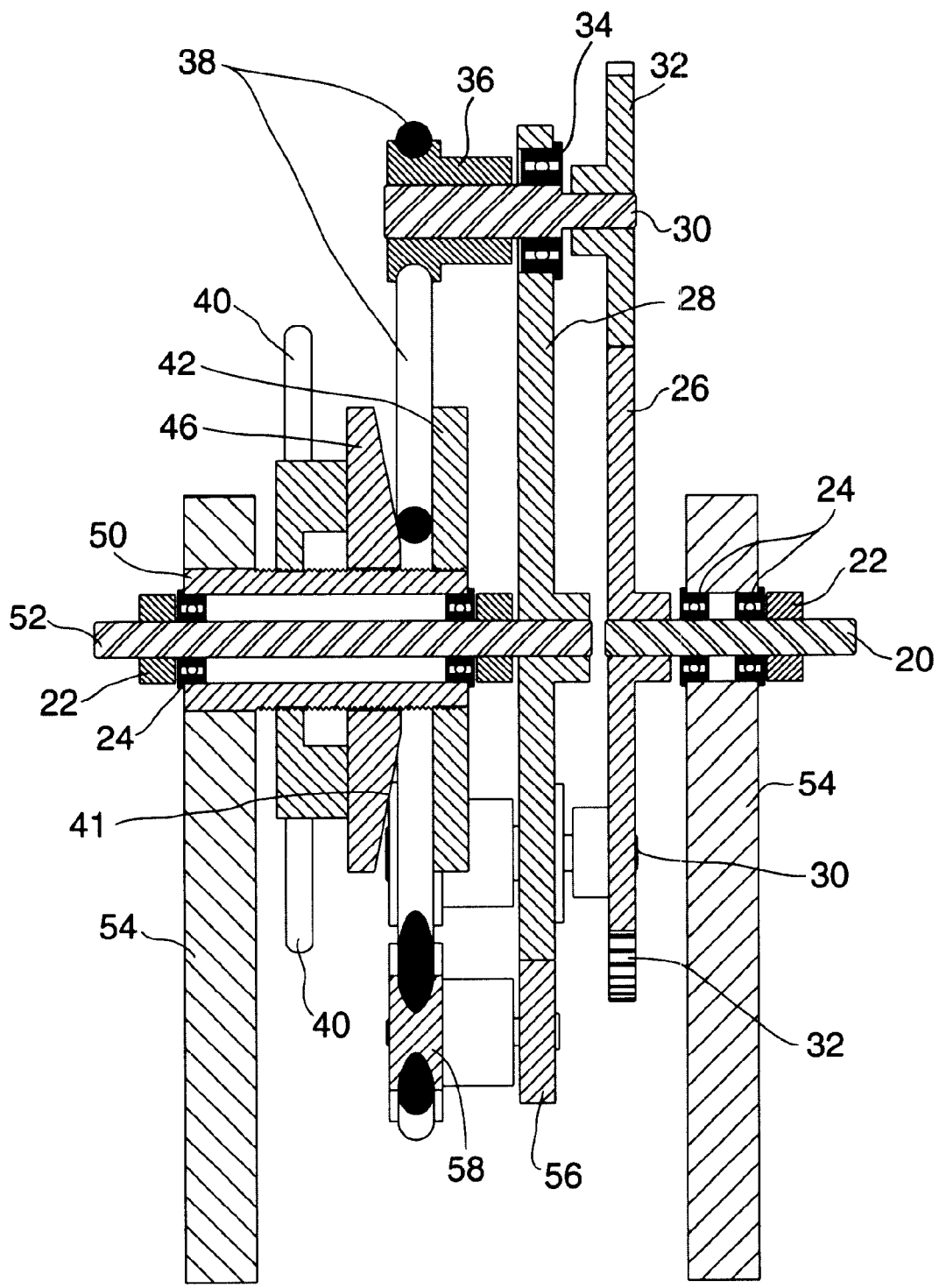
FIG. 2 is a side sectional view of the embodiment depicted in FIG. 1, taken substantially along line A—A in FIG. 3.
Figure 3:
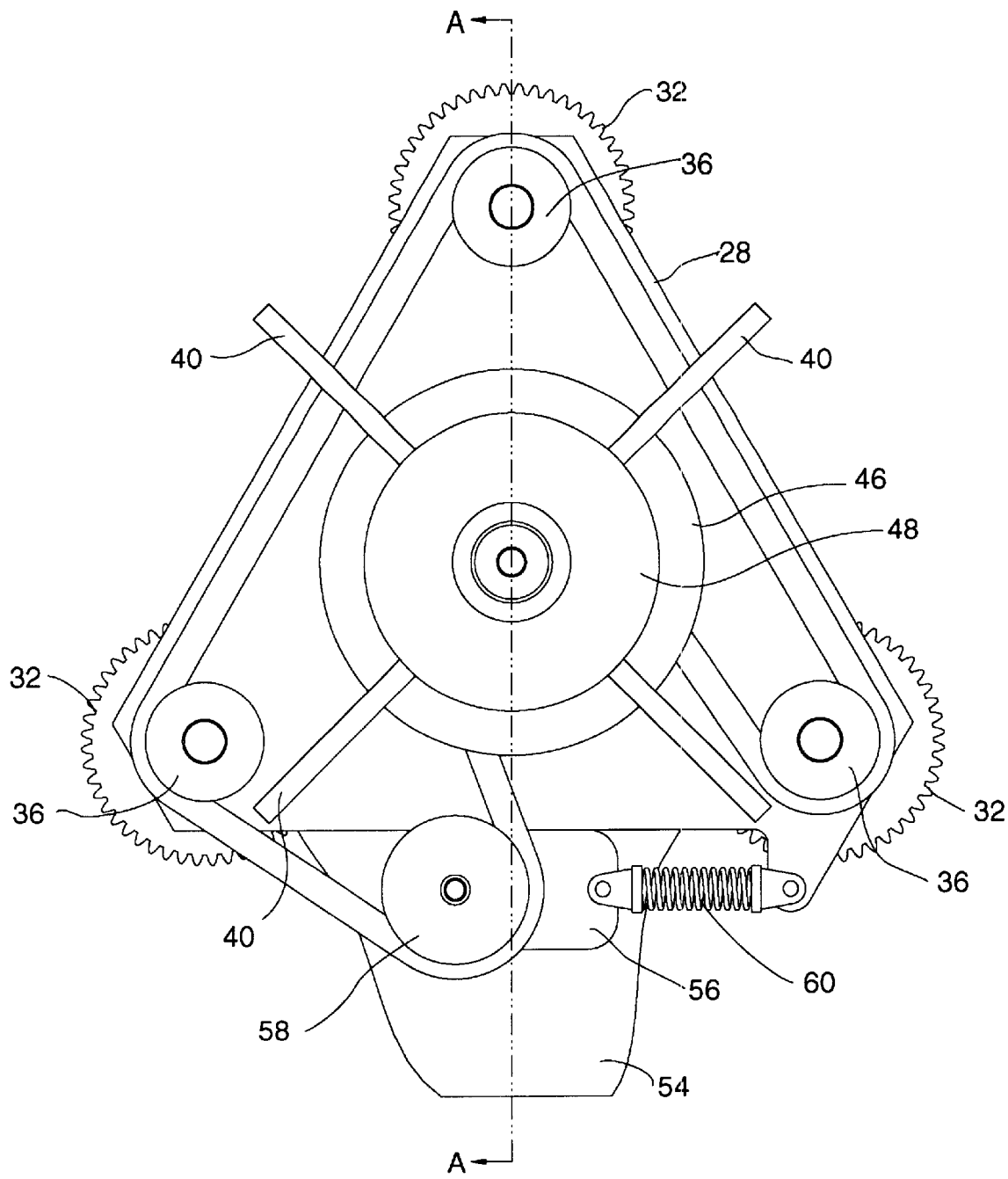
FIG. 3 is a front view of the embodiment depicted in FIG. 1.

One embodiment of the invention, featuring a compact serpentine endless belt is illustrated in FIGS. 1–3. Principal components of this embodiment include the input shaft 52 which is the component by which the input force is delivered to the apparatus of the invention, the planetary carrier 28 rotationally fixed upon the input shaft, the support tube 50 disposed coaxially around the input shaft, a plurality (usually at least three) of input rotation members (preferably planetary pulleys 36) disposed upon the planetary carrier, a variable pitch pulley 41 having two disks 42 and 46, and a belt 38 disposed in a serpentine fashion among the planetary pulleys and the variable pitch pulley. The belt 38 thus serves as a means for transferring torque from the planetary carrier to the planetary pulley input rotation members 36. Also important to the make-up of the invention are a plurality of planetary gears 32 upon respective planetary axles 30 rotatably mounted on the planetary carrier 28, and the output shaft 20 upon which is fixed the sun gear 26. The teeth of the sun gear 26 engage the teeth of the planetary gears 32. Accordingly, the plurality of planetary gears 32 are rotatably mounted upon the planetary carrier 28 to rotate at a planetary rotation speed relative to the planetary carrier, with the planetary gears also all engageable with the sun gear 26. By these components, and others to be described, rotational energy is transmitted from the input shaft 52 to the output shaft 20 in a variably controllable manner as set forth below.

Continued combined reference is made to FIGS. 1–3. In this embodiment, the input rotary power applied to the input shaft 52 drives the planetary carrier 28. Input shaft 52 is rotatably mounted in the apparatus case 54 by the bearings 24. The rotation imparted to the planetary carrier 28 by input shaft 52 causes the three planetary pulleys 36 to revolve around the central axis generally defined by the input shaft 52. The corresponding planetary axles 30 connect the three planetary pulleys 36 to the planetary carrier 28. The planetary pulleys 36 are fixed upon the planetary axles 30, but the axles 30 are borne upon associated bearings 34 in planetary carrier 28 so that the axles 30 rotate at a planetary rotation speed with respect to the carrier 28. The planetary axles 30 preferably are disposed equidistantly about the circumference of the generally disk-like planetary carrier 28, proximate to its periphery.

Also rotationally fixed upon planetary axles 30 are planetary gears 32 corresponding in number and radial position with the planetary pulleys 36. Because the planetary pulleys 36 and planetary gears 32 are fixed to common axles 30, the rotation of pulleys 36 results in the rotation of the planetary gears 32 at the same planetary rotational speed. Thus, the plurality of planetary pulleys 36 are rotatably mounted upon the planetary carrier 28 and also connected to the planetary gears 32, to rotate with the planetary gears at the same planetary rotation speed.

Control of the apparatus is obtained by actuating the rotationally fixed central pulley member, being a variable pitch split pulley 41 including two components, a fixed disk 42 and an axially adjustable disk 46. Mounted to the support tube 50 are the elements defining the rotationally fixed variable pitch pulley 41, including the fixed disk 42 and the axially adjustable tapered disk 46. Also mounted on the support tube 50 is an adjustment collar 48, or other means of axially moving the adjustable disk 46 to selected positions. Both the disks 42 and 46 in the variable pitch pulley 41 are rotationally fixed on the centrally disposed support tube 50. Fixed disk 42 is secured to the support tube 50 by threads or other means, while the axially adjustable disk 46 is keyed into the support tube 50 and allowed free axial movement with axial placement and movement selectively controlled by a mating collar 48. Mating collar 48 is threaded onto the support tube 50 and rotated by means of, for example, the extended arms 40. Various other known modes for controllably adjusting the axial position of the adjustable disk 46 relative to the fixed disk 42 are suitable for use in the invention, including mechanical bellows, hydraulic piston, mechanical linkages, and the like. A flexible, substantially non-extensible endless belt 38 connects each of the planetary pulleys 36 by running on the outer circumference of each planetary pulley 36, and around the variable split pulley having the disks 42 and 46, in the serpentine arrangement shown in FIG. 3.

Figure 4:
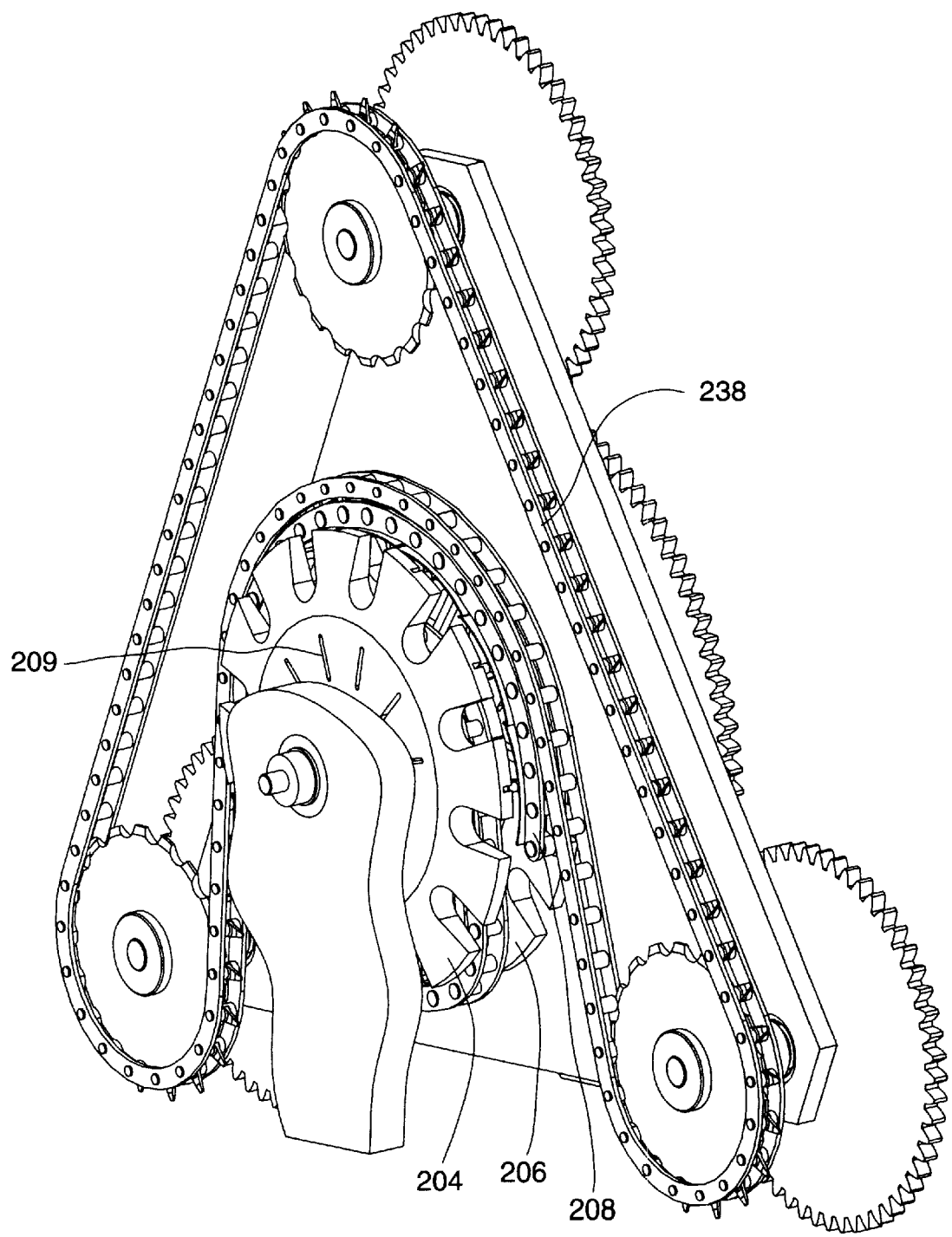
FIG. 4 is a perspective view of a variation of the embodiment depicted in FIG. 1, showing a chain in lieu of a belt and a mechanically adjustable capstan in lieu of a variable pitch pulley.

The endless serpentine belt 38 engages the planetary pulleys 36 and the centrally located disks 42, 46 of the variable pitch pulley 41. An endless chain may be used in lieu of a belt in alternative embodiments (FIG. 4). As best seen in FIGS. 1 and 3, the belt 38 is specially disposed in the apparatus. If the belt 38 is characterized as a closed loop having an inside surface or side and an outside surface or side, the outside surface contacts only the disks 42, 46 of the variable pitch pulley 41. The inside of the belt 38 contacts the planetary pulleys 36. Referring to FIG. 3, it is observed that, during operation of the invention, the inside surface of the belt 38 engages an arcuate sector (e.g., between approximately 120° and approximately 180°) of the working circumferential face of each of the planetary pulleys 36, while the outside surface of the belt 38 contacts the working surfaces of the disks 42, 46, notably the tapered face of adjustable disk 46. As will be further described herein, however, the belt 38 moves around the variable pitch pulley 41 in a manner which provides for constant contact between the belt and the variable pitch pulley, but at successively different sectors of the disks 42, 46.

A tension pulley 58 also engages the belt 38 and, under the biasing action of a spring 60, serves as an "idler" to maintain the tension in the belt 38 in a conventional manner.

Various types of endless belts 38 may be used along with their appropriate mating pulleys 36 and 41, including round belts as shown in FIGS. 1–3, belts with cogged faces mating with cogged pulleys, and V-back belts mating with the variable adjustment pulley 42, 46, or double V-belts with one face mating with V-grove planetary pulleys and the other V-face mating with the variable pitch pulley 41.

Additionally, it is noted that alternative embodiments such as that seen in FIG. 4 may employ a linked chain loop in lieu of an endless belt. Thus, in this description and in the claims, unless otherwise indicated, the term "belt" shall include other flexible looped components, particularly chains. Similarly, alternative embodiments using a chain instead of a belt may employ toothed sprockets in place of the pulleys 42, 46 and 36, again as generally indicated in FIG. 4. Thus, in this disclosure and in the claims, unless otherwise indicated the term "pulley" shall be interpreted to include a sprocket serving an equivalent function.

The output side of the apparatus includes the sun gear 26 which is rotatably fixed upon the output shaft 20. The output shaft is rotatably mounted in the apparatus case 54 by the bearings 24 so that the output shaft 20 is free to rotate with respect to the case 54. The exterior teeth of the sun gear 26 mesh with the teeth of the several planetary gears 32, this meshing being the mechanical means by which force is transmitted from the planetary carrier 28 to the sun gear 26.

Accordingly, the apparatus of the first embodiment features an epicyclical gear train including the central planetary carrier 28 driven, via the input shaft 52, by the prime mover at input rotational speed $w_i$. A plurality, preferably three, of planetary sets, each comprised of a planetary pulley 36 and a planetary gear 32 fixed on an associated planetary axle 30, are carried in corresponding bearings 34 disposed in the planetary carrier 28 and spaced at equiangular intervals. Because each pair of planetary pulley 36 and planetary gear 32 is attached to a common planetary axle 30, they rotate at a common speed. Each of the three planetary gears 32 engages the output sun gear 26 which is fixed to the output shaft 20 rotating at the output rotational speed $w_o$. Output shaft 20 is supported through the transmission case 54 by bearings 24 and secured by collars 22. Support tube 50 is permanently affixed to the transmission case 54 and houses bearing 24 through which the input shaft 52 rotates as it extends into and is permanently attached to the planetary carrier 28.

During operation of the apparatus, while rotation is imparted to the planetary carrier 28 by the action of the input shaft 52, the speed and direction of rotation of the output shaft 20 is controllably adjusted by manipulating the variable pitch pulley 41 made up of the two disks 42, 46. The operator controls the axial movement of the adjustable disk 46. As the axially adjustable tapered disk 46 moves closer to the fixed disk 42, the effective diameter of the variable pitch pulley which engages the outside surface of the endless belt 38 increases. The change in the effective diameter of the variable pitch pulley 41 effectuates a change in the speed at which the belt 38 rotates around that pulley, which in turn is translated into a change in the speed at which the planetary pulleys 36 and gears 32 revolve around the central axis defined by the input shaft 52.

Input power is provided to the input shaft 52 at a fixed input rotational speed $w_i$, which rotates the planetary carrier 28 at the input speed. In the absence of the endless belt 38 operably connecting the planetary pulleys 36 to the rotationally fixed variable pitch pulley 41, no torque would be transferred to the output sun gear 26. Each planetary axle 30 and planetary gear 32 would be allowed to freely rotate at a free rotational speed, simply riding around the periphery of a motionless sun gear 26. The endless belt 38 provides the drive torque controlling the planetary rotational speed of the planetary pulleys 36, and thus also the planetary gears 32, to be either slower than the free rotational speed or faster than the free rotational speed.

As the planetary carrier 28 is powered to rotate at the input rotational speed, the planetary pulleys 36 revolve around the central axis of the apparatus. The connecting belt 38 thereby is simultaneously wrapped against one side of the rotationally fixed variable pitch pulley 41 and unwrapped from the opposite side. The belt 38 thus is constantly in contact with the variable pitch pulley, but since the variable pitch pulley is non-rotating, the sector of the pulley contacted by the belt is constantly changing. The belt 38 engages a particular point on the variable pitch pulley at a periodic interval corresponding to the input rotational speed. This action draws the endless belt 38 around the rotationally fixed variable pitch pulley 41, which in turn provides traction to the planetary pulleys 36. The tractive engagement of the belt 38 with the planetary pulleys 36 causes the pulleys 36 to rotate about their individual axes at planetary rotational speeds greater than, equal to, or less than the free rotational speed described above. The traction provided from the rotationally fixed variable pitch pulley 41 to the planetary pulleys 36 by way of the endless belt 38 either increases the rotational speed of the planetary pulleys 36 to a value greater the free rotational speed, or retards the rotational speed of the planetary pulleys 36 to a value less than the free rotational speed, depending upon the effective diameter of the variable pitch pulley, as selected by the operator. The variable pitch pulley 41 and the belt 38 thus serve as a means for selectively modifying the rotational speed of the planetary pulleys 36.

The operator thus can, by selectively adjusting the effective diameter of the variable pitch pulley (e.g. by manipulating the arms 40 to move the axially adjustable disk 46), control the planetary rotation speed of the planetary pulleys 36. Due to the direct meshing engagement of the planetary gears 32 with the sun gear 26, adjustment of the planetary rotation speed results in a modification in the output rotation speed of the out put shaft 20.

Thus, the input shaft 52 imparts torque to the planetary carrier 28, which causes the planetary pulleys 36 to revolve about the central axis, and the engagement of the inside surface of the belt 38 with the planetary pulleys causes the planetary pulleys to rotate, thereby rotating the planetary gears 32 at the planetary rotational speed; and adjusting the effective diameter of the variable pitch pulley 41 modifies the rotation speed of the planetary pulleys 36, which in turn modifies the planetary rotation speed, which changes the output rotation speed.

When the rotational speed of the planetary pulleys 36 is retarded to be less than the free rotational speed, the rotation of the output shaft 20 is in the same direction as that of the input shaft 52; i.e., the output speed $w_o$ (of the output shaft 20) and the input speed $w_i$ (of the input shaft 52) have the same algebraic sign (stated differently, both input and output shafts rotate clockwise). When the rotational speed of the planetary pulleys 36 is greater than the free rotational speed, the rotation of the output shaft 20 is opposite in direction to the input shaft 52; i.e., the output speed $w_o$, and input speed $w_i$, are opposite in algebraic sign (i.e. one shaft rotates clockwise, the other counterclockwise). The idler pulley 58 and spring 60 appropriately tension the inextensible endless belt 38, and provide a means of taking up the slack in the belt as the rotationally fixed variable pitch pulley 41 is changed to a smaller effective diameter pitch.

It is seen therefore, that as the effective diameter of the central pulley member is progressively increased, the gear ratio of the overall inventive apparatus decreases, eventually approaching zero. With continued increase of the effective diameter, the gear ratio approaches and then passes through zero, and then, with further effective diameter increase, actually reverses so that the overall gear ratio begins to increase, but with output torque in the opposite direction from the input torque. Due in part to the serpentine belt configuration, the entire switch from forward to reverse is accomplished continuously, without clutching, and without modifying the input rotational speed.

The integral compact nature of the serpentine mechanism offers miniaturization possibilities not found in other infinitely variable speed change mechanisms. Speed change mechanisms in the meso scale (2 to 3 cubic inches) to micro scale range (0.1 to 1 cubic inch) are possible with this design and can then be incorporated into toys, power tools, assistive machines for persons with disabilities, light industrial equipment and other important areas. Because of its compact size, fully integrated speed control features, the serpentine mechanism has a variety of commercial applications; e.g. speed control for bicycles, cranes, winches, personnel lifting devices, and the like.

Governing Equations

In the following equations, $D_{xx}$ denotes the pitch diameter of gear, sprocket, or pulley xx, for example, $D_{42}$ denotes the pitch diameter of the rotationally fixed variable pitch pulley 41, and $D_{36}$ is the diameter of the planetary pulleys 36. $W_4$ is the rotational speed of the planetary sets of planetary pulleys 36 and planetary gears 32.

$$w_o = w_i - (D_{32}/D_{26})w_4 \qquad 1)$$

$$D_{42} w_i = D_{36} w_4 \qquad 2)$$

Solving equation 2 for $w_4$ and substituting that relationship for $w_4$ into equation 1, and reordering the result to show the ratio of the output speed, $w_o$, to the input speed, $w_i$, produces the governing relationship for this first embodiment of the invention:

$$w_o/w_i = 1 g D_{42} \qquad 3)$$

Where $$g = D_{32}/(D_{26} D_{36}) \qquad 4)$$

As will be shown in the following equations, this embodiment can be configured such that for a constant input rotation speed turning the input shaft, the output speed can be forward, neutral, or reverse by changing the pitch diameter $D_{42}$ of the variable pitch pulley.

Choosing the following components with the following pitch diameters:

$D_{32}$=2.28

$D_{26}$=3.42

$D_{36}$=1.50

$D_{42\ min}$=1.50

$D_{42\ max}$=3.00

The following speed ratios are achievable:

At $D_{42}$=3.00; then $w_o/w_i$=−0.33 (that is, direction of the output rotation of output shaft 22 is opposite of the input shaft 52 and about one-third as fast).

At $D_{42}$=2.25; then $w_o/w_i$=0.00 (infinite gear ratio, i.e. output rotation speed is effectively zero for any input rotation speed)

At $D_{42}=1.50$; then $w_o/w_i=+0.33$ (direction of the output rotation is the same as the input, but again, only one-third as fast)

(As ratios are indicated, dimensional units are self canceling and irrelevant, the negative sign indicates that the output rotation is reverse of the input rotation.)

Not only can the pitch diameters of this embodiment be chosen to provide both a balanced speed range on each side of the infinite ratio point, but other ratios can be chosen that will provide a broader range of output speed variation when a range is biased with respect to the infinite ratio point. Depending on how close to the zero the output speed is selected, the ratio of the minimum output speed to maximum output speed can be made to be very large. When a particular output speed is desired with respect to a particular input rotational speed, then an additional gear box may be placed in series with the transmission apparatus of the invention.

The ultimate torque capability of this embodiment is dependent on the contact friction that can be developed between the endless belt 38 and the planetary pulleys 36, or the endless belt 38 and the rotationally fixed variable pitch pulley 41, or by the tensile load capability of the endless belt 38. The serpentine belt configuration can be chosen to minimize the tensile stress in the endless belt 38 by appropriate choices for the pitch diameter of the gears and pulleys. The relationship between the tensile load $Tn_B$ (expressed in units of force) in the endless belt 38 and the output torque $T_o$ (expressed in units of force times distance) imparted to the output shaft 20 is:

$$Tn_B = gT_o, \quad\quad 5)$$

where g is as given in Equation 4 above.

For most practical applications the parameter g can be chosen to be between 0.2 and 0.8. For a given tensile load capability of the endless belt $Tn_B$, applications requiring higher output torque $T_o$ will demand that the gear ratios be chosen to reduce the value of g.

A major feature of this embodiment not found in other continuously variable speed control devices is that the actual elements that effect the speed change are fully self-contained within the mechanism housing 54. Also, unlike the mechanism described in, for example, U.S. Pat. No. 5,632,703, the disclosed apparatus does not require an external belt mechanism to perform the forward, neutral, and reverse functions. Further, this embodiment is extremely compact, requiring little more than one gear width to function. The apparatus can be entirely enclosed and shielded from dirt and debris. Very accurate control of the contact radius $D_{42}$ can be achieved with the apparatus because the range of radial motion necessary to change the radius can be designed to be large for very accurate control, or relatively small for rapid change of speed.

Figure 5:
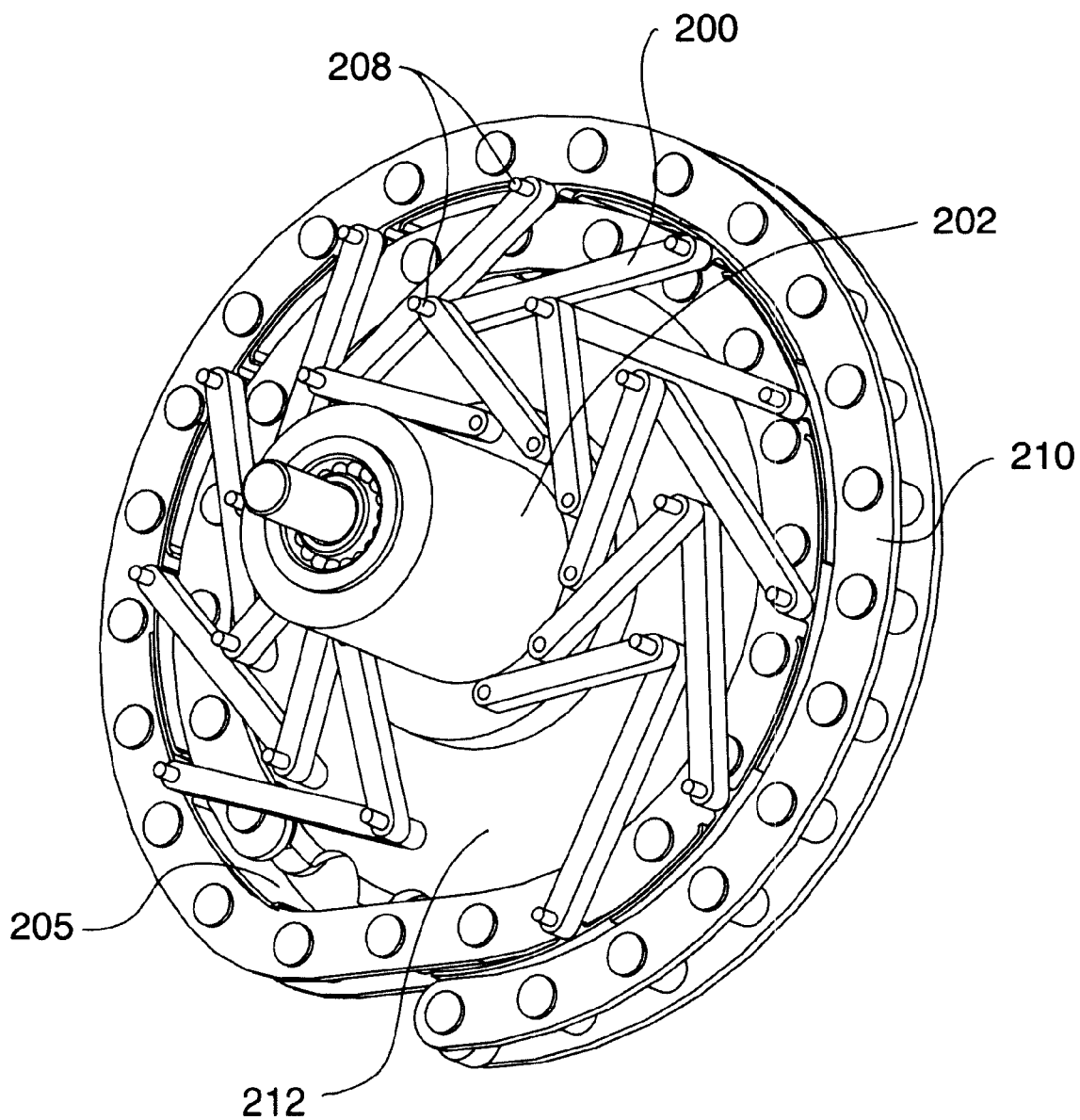
FIG. 5 is an enlarged perspective view of the capstan elements of the embodiment depicted in FIG. 4, showing the capstan in a first position of reduced effective diameter.

FIGS. 4 and 5 depict a variation of the serpentine belt embodiment of the invention, employing an endless chain instead of an endless belt. This variation on the serpentine belt embodiment functions in generally the same manner as the variation using an endless belt described above, but the construction of certain components is distinguished. In lieu of a variable pitch pulley as the central pulley member, in this variation the central pulley member is a mechanical "iris" or variable diameter capstan. The variable diameter capstan is employed to vary the effective diameter of the component engaging the outside surface of the endless chain. FIG. 4 is a perspective view (comparable to FIG. 1) of the iris with epicyclic gear train, while FIG. 5 is a planar view of the iris elements.

Figure 6:
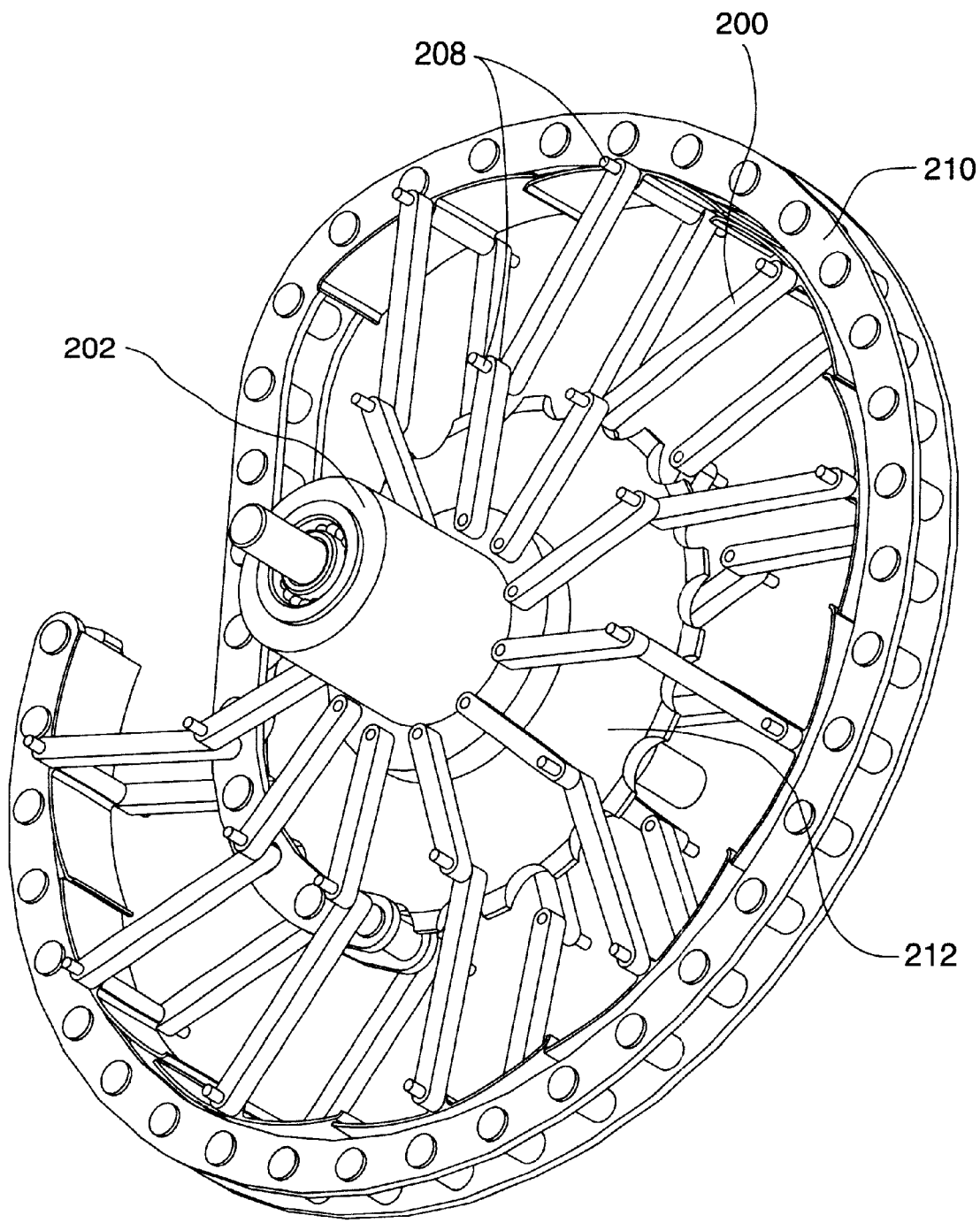
FIG. 6 is a perspective view of the elements depicted in FIG. 5, showing the capstan in a second position of comparatively increased effective diameter.

This variation to the serpentine belt embodiment of the invention supports applications requiring very high torque by employing a serpentine chain 238 rather than a serpentine belt. The chain is capable of much larger tensions and will not slip when run over toothed sprockets. As shown in FIGS. 4 and 5, the central variable pitch pulley of the is replaced with a segmented pulley, comprised of a plurality of jointed arms 200 pivoted at the hub 202 and guided between two slotted regulating rings 204 and 206. These rings 204, 206 also serve to capture and guide the pulley rim segments 205 using pins 208 projecting from the segments that ride in grooves in the rings. As best seen in FIG. 6, a mating adjustment chain 210 is deployed from within the hub 202 by a ratcheted sprocket 212, the end of which is attached to a rigid link. This adjustment chain 210 is capable of mating with the deployment sprocket 212 as well as possessing additional features, one on each link, that engage the serpentine drive chain 238. The adjustment chain 210 optionally may take the form of a bead chain, similar to a string of beads, which can nest between the links of the serpentine chain 238 and deploy from a sprocket with appropriate pockets cut in the outer periphery. Other chain devices and mating elements are also possible.

Whereas the other versions of transmissions described herein are continuously variable in gear ratio, this variation works by deploying or retracting at least one entire mating segment of the mating or adjustment chain 210 which changes the gear ratio by finite steps. This stepwise performance provides for very small incremental changes in gear ratio. For example, if the chain includes 100 links, then 1% incremental changes are possible. Hence, albeit not truly "continuously" variable, this variation is nevertheless more useful than transmissions that require a clutch and have only three or four gear ratios from which to choose.

Deployment of the adjustment chain 210 is limited to the portion of the revolution of the serpentine chain 238 that leaves the deployment area of the pulley uncovered. Until this occurs, the adjustment chain 210 is engaged to the serpentine chain 238 at both the fixed and the emergent locations and thus cannot be made to move. The deployment of the adjustment chain 210 can be variously regulated, although the deployment or retraction is limited to chain link units. This suggests the use of several possible ratchet-and-pawl mechanisms that engage the teeth of an adjustment sprocket 212.

Regulation of the length of the adjustment chain 210 engaging the serpentine chain 238 thus regulates the effective "diameter" of the adjustment chain 210, comparable to the changes effectuated by the operation of the variable pitch pulley of the previously described variation of the invention. This regulation allows the pulley segments to either increase or decrease the effective diameter of the iris or capstan to change transmission ratios as well as support the chain loads. These segments and the links that support the loads are guided so that they are held concentric with the central axis of the transmission (defined by the input shaft 52). This guiding action is accomplished with a pair of rings 204, 206 that are supported with bearings to rotate about the central axis. Pins 208 that project from the link and pulley segment pivots ride in slots 209 in the rings 204, 206.

Figure 7:
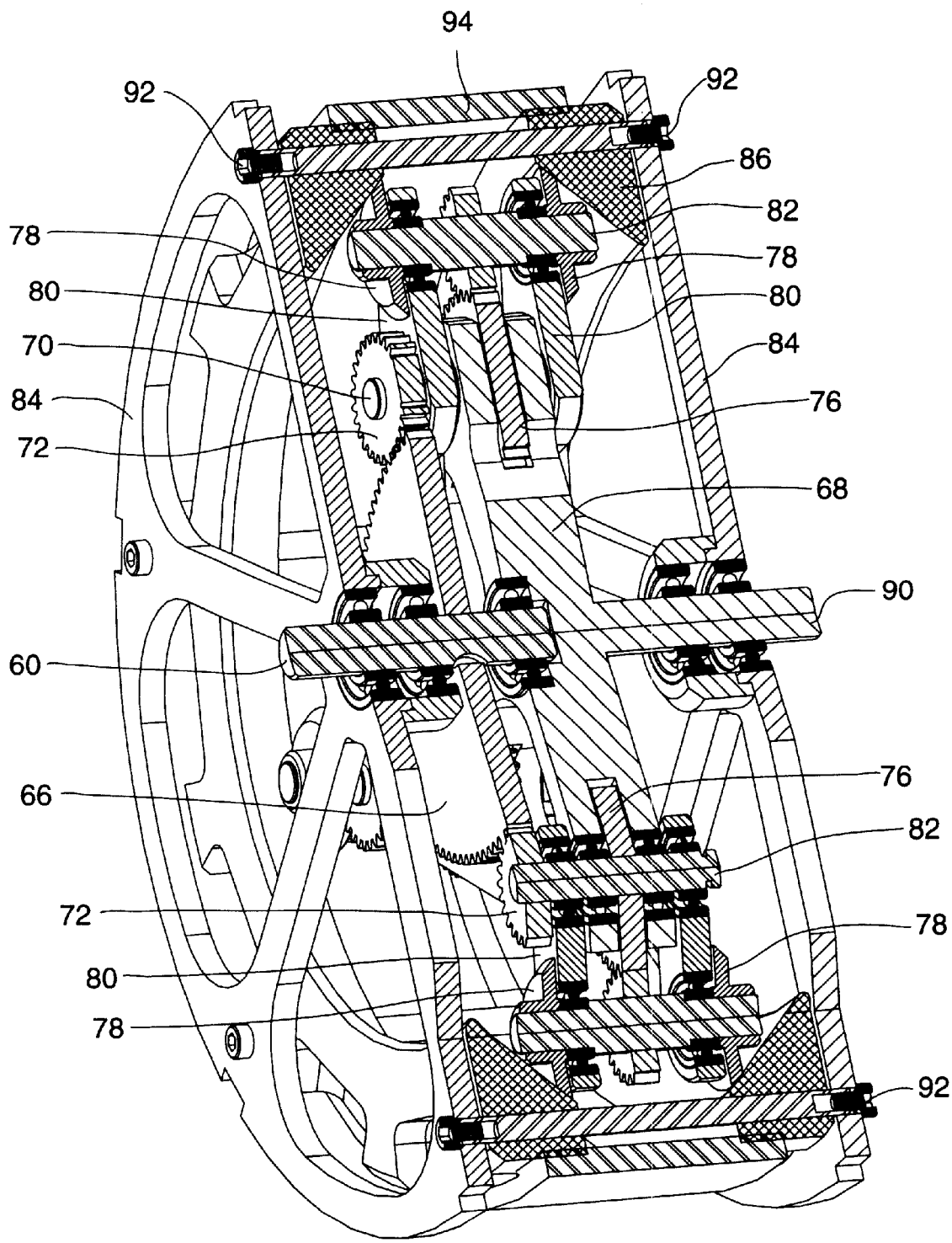
FIG. 7 is a cross sectional perspective view of a second embodiment of the invention, showing the use of contact rollers and a split tapered race as the components by which independent speed control achieved.
Figure 8:
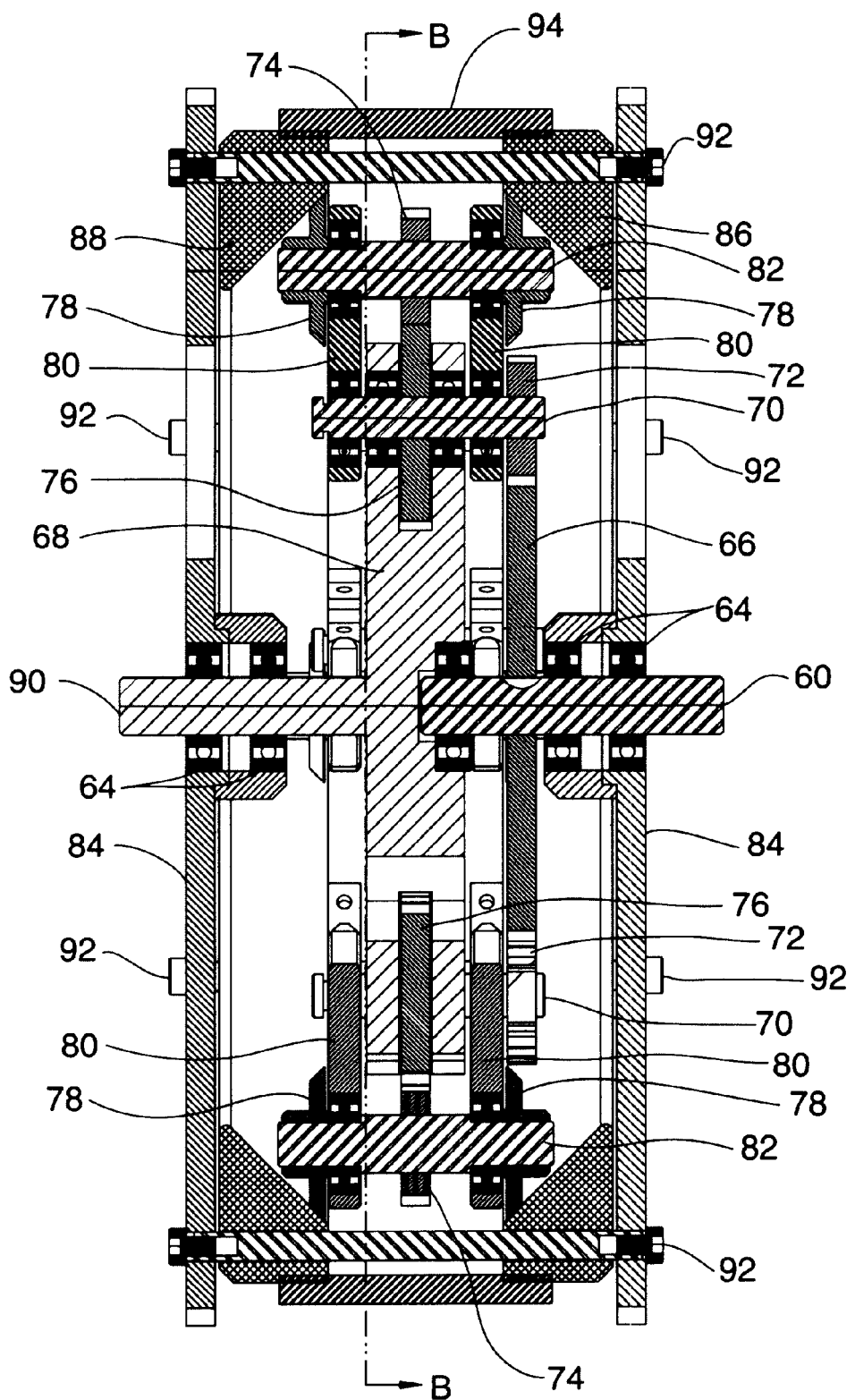
FIG. 8 is a side sectional view of the embodiment shown in FIG. 7, taken substantially along line A—A in FIG. 9.
Figure 9:
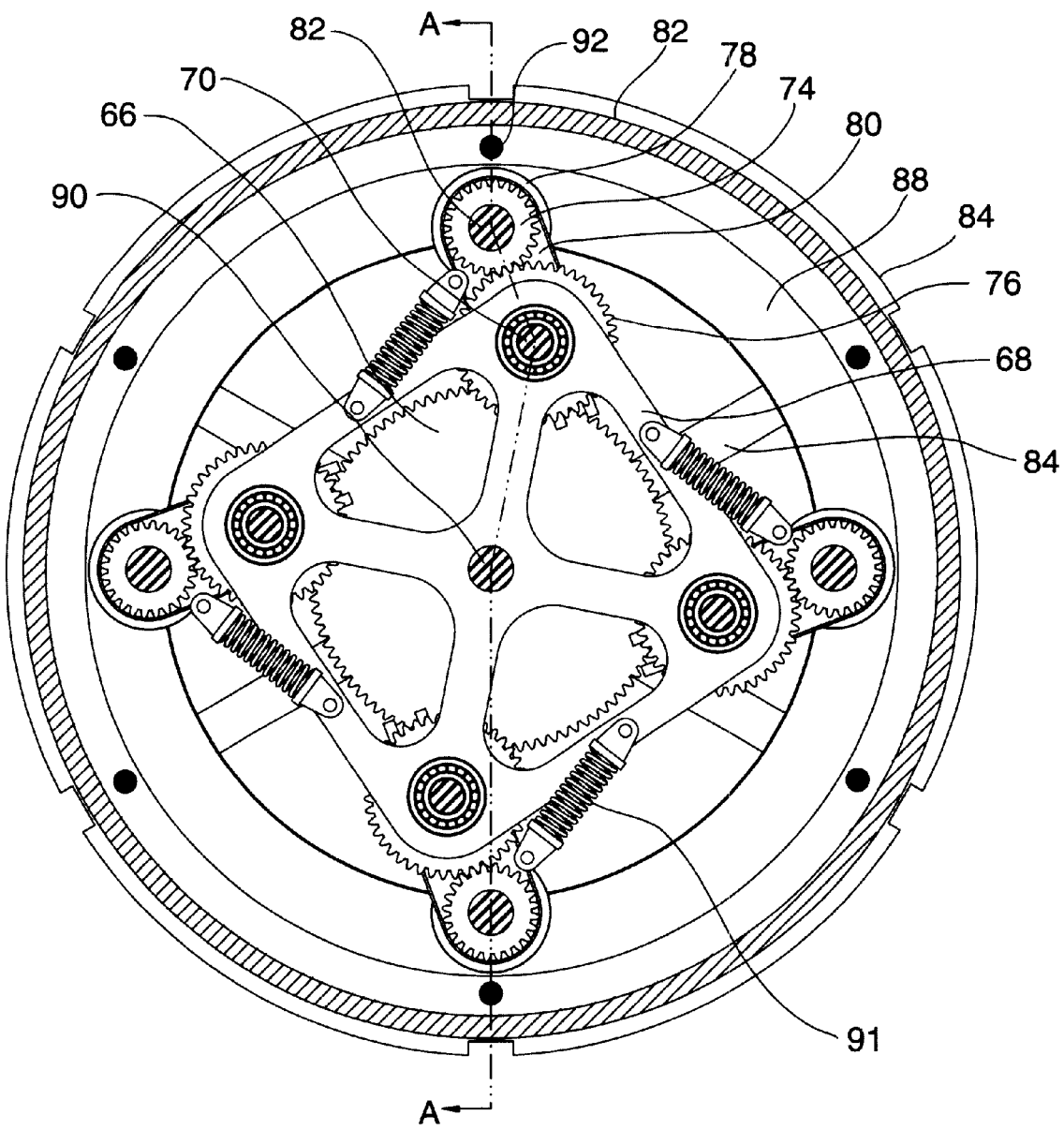
FIG. 9 is a front sectional view of the embodiment depicted in FIG. 7, taken substantially along line B—B in FIG. 8.

An alternative embodiment of the invention is depicted in FIGS. 7–9. In this embodiment, a compact split race swing arm mechanism permits the infinitely variable adjustment of the output rotation speed. This embodiment of the invention is capable of transmitting large torque and high power. The apparatus permits the input rotation to be maintained in a constant direction and constant speed, yet controlling the output rotation to be forward, neutral, or reverse while transferring high power and high torques. As such, this embodiment functions not only as a transmission, but also as an integral clutch, disconnecting the prime mover output from the final drive mechanisms.

Like the other embodiments described, the split race swing arm embodiment is advantageously very compact, especially in the axial dimension, and optimized in radial dimension depending only on the size of the gears necessary to transfer the torques demanded by a particular application. Despite the compactness of the embodiment, the input shaft of this embodiment nevertheless is coaxially aligned with the output shaft. A key feature allowing the split race swing arm transmission to transfer high power and high torques is that there is no belt used in the speed control of the planetary elements. Moreover, as a particular application demands increased torque, an embodiment having additional planetary sets (e.g. elements 76 and 72 in FIG. 7) maybe supplied, the planetary sets equiangularly spaced in a planetary carrier (68 in FIG. 7), and with additional contact rollers 78 supported by the swing arms 80, to provide additional contact points for the power transfer (all as seen in FIG. 7). The output speed is adjusted by varying the radius of contact between control rollers 78 and at least one, preferably two, tapered split races 86 and 88 disposed coaxially to the central axis.

Attention is invited to FIGS. 7–9. Like the first embodiment described above, this embodiment has a planetary gear carrier 68 fixedly mounted on the input shaft 90 to rotate at input rotation speed $w_i$. Disposed on the planetary gear carrier 68 are a plurality (preferably at least three) planetary sets, each set comprised of a planetary output gear 72 and a planetary drive gear 76, both of which are permanently attached to the planetary axle 70, a pair of planetary swing arms 80 which pivot about the planetary axle 70, and a planetary moon gear 74 which meshes with the planetary input gear 76. Each planetary set also features at least one, preferably pair, of planetary contact rollers 78, both of which are attached to the moon gear axle 82. The planetary moon gear axle 82 in turn is supported by a set of bearings in the swing arms 80. Planetary axle 70 also is supported by bearings permitting the axle 70 freely to rotate with respect to the carrier 68. Because the planetary output gear 72 and planetary drive gear 76 are both rotationally fixed to the planetary axle 70, the two gears 72, 76 rotate at a common planetary rotational speed $w_4$. Likewise, because the planetary contact rollers 78 and planetary moon gear 74 are rotationally fixed upon moon axle 82, the rollers and planetary moon gear all rotate at a common tertiary rotational speed $W_3$. Thus, the contact rollers 78 function as input rotation members, and the contact between the rollers and the races 86, 88 is a means for transferring torque from the carrier 68 to the contact rollers. The planetary moon gears 74, the planetary drive gear 76, and planetary axle are the means by which torque is transferred from the contact rollers 78 to the planetary output gears 72. The number of planetary sets in a version of the embodiment is adaptable, depending on the overall size of the apparatus and power rating required of the transmission. The planetary sets are equiangularly spaced on the planetary carrier 68, as suggested in FIG. 9. Each of the planetary output gears 72 meshes with and drives the common sun output gear 66, which is rotationally fixed to the output shaft 60.

The planetary contact rollers 78 are pressed into frictional contact with and ride on the tapered, axially movable, split races 86 and 88. The tapered split races 86 and 88 are toroidal with centers coaxially aligned with the axes of the input shaft 90 and output shaft 60. In operation, the engagement of the contact rollers 78 with the races 86 and 88 causes the rollers to rotate under the influence of the rotating carrier 68. Planes containing tapered split races 86 and 88 are parallel with the races, and are supported by pins 92 or other guides attached to the transmission housing 84. Pins 92 fix the races 86 and 88 against rotation, but allow the races 86 and 88 to be axially movable to selected relative distances from each other by means of a threaded cap ring 94, hydraulic calipers, or other suitable mechanical linkages. A spring 91 is attached between each of the swing arms 80 and the planetary carrier 68. The springs bias the swing arms 80 to pivot radially outward (or alternatively inward in the variation of FIG. 10), thereby forcing the planetary contact rollers 78 against respective tapered split race elements 86 or 88. Other means, besides linear springs, such as leaf springs, torsion springs, or compression springs are capable of imparting torque about planetary axle 70 to bias the swing arms 80 radially outward.

As best seen in FIGS. 7 and 8, the tapered split races 86 and 88 are machined with tapered faces, such that the distance between the faces progressively decreases in proportion to the radial distance outward from the central axis (defined generally by the input and output shafts). Thus, as the races are moved together or apart along an axis common with the input shaft 90 and output shaft 60, they affect the radial positions of the contact rollers 78. As the axial positions of the split races 86, 88 are selectively adjusted, the radial distance between the central axis of the apparatus and the points of engagement between the contact rollers 78 and the races 86, 88 increases or decreases. The axially movable races 86, 88 are a means, therefore, for selectively modifying the rotational speed of the contact rollers 78.

An additional feature of this embodiment is that the entire transmission is contained in a sealed case 84, allowing all of the major components to be bathed in a lubricating fluid if desired, hence reducing frictional losses and increasing the life of the major components. All of the major elements of the apparatus are housed in a rotationally fixed housing 84 containing seals and bearings 64 about the input and output shafts 90, 60. Both the tapered split races 86 and 88 are attached to the housing 84 such that they are not allowed to rotate, and are controlled to move axially along supporting features in the housing. In operation of the apparatus, the direction of the input rotation is selected such that the contract rollers 78 are pressed against the split races 86, 88 with increasing pressures by the pivotal swing arms 80 as the output torque increases.

The rotational direction of the input is selected to lead the obtuse angle defined between a radius from the central axis of the apparatus to the axle 70 of a planetary input gear 76 and the imaginary line connecting the center of that respective axle 70 and the center of the associated moon gear axle 82 (as indicated by the counterclockwise directional arrow of FIG. 9). This relation between the torque input and the points of engagement between the planetary contact rollers 78 and a respective tapered split race 86 or 88 increases the frictional contact between rollers 78 and races 86, 88 as output torque increases. This benefit results because the contact stress between planetary contact rollers 76 and a respective tapered race 86 or 88, responsible for rotating the planetary contact rollers 76 and planetary moon gears 78, creates a moment on the swing arms 80 about the planetary axle 70 that is additive to the torque generated by the springs 91. The moment about axle 70 tends to increase the obtuse angle between the radius and the swing arm 80 as described above. The arm 80 consequently pivots radially, increasing the normal contact pressure between tile planetary contact rollers 78 and the respective tapered split race 86 or 88. This feature of the apparatus is self-amplifying, which provides the capability to transfer high power at high torque levels.

Thus, the input shaft 90 imparts torque to the planetary carrier 68, which causes the contact rollers to revolve about the central axis, and the engagement of the contact rollers with at least one, preferably two, races causes the rollers to rotate. The rotation of the rollers 78 rotates the output gears at the planetary rotational speed. Adjusting the radial distance from the central axis to the points of contact between the rollers 78 and the races 86, 88 modifies the rotation speed of the contact rollers, which in turn modifies the planetary rotation speed, thereby changing the output rotation speed.

The operation of the split-race embodiment is now described. Rotary input power is provided to the input shaft 90 at a fixed rotational speed $w_i$ which rotates the planetary carrier 68 at the input speed. The split races 86 and 88, the planetary contact rollers 78, the swing arms 80, the planetary moon gears 74, and the planetary drive gears 76, using the input rotation of the planetary carrier 68, collectively supply the necessary torque to independently vary the rotational speed of the planetary output gears 72. In the absence of this collection of components, no torque would be transferred to the output sun gear 66. Rather, each of the planetary output gears 72 would be allowed freely to rotate at a free rotational speed, simply riding around the output gear 66. In the inventive apparatus, the split races 86 and 88, contact roller 78, and planetary moon gear 74 meshing with the planetary input gear 76, are the power train providing the drive torque to control the rotational speed of the planetary output gears 72. By controlled manipulation of the races, 86, 88, the rotation of the planetary output gears 72 may be either slower than the free rotational speed, or faster than the free rotational speed, described above.

As the planetary carrier 68 rotates at the input rotational speed, the circumferential path length along which the planetary contact rollers 78 must travel on the tapered split races 86, 88 can be selectively varied by the operator. The circumferential path length depends upon the radial distance from the central axis of the apparatus to the points of engagement between the rollers and races. As the radial distance increases, the path length which each planetary contact roller 78 must travel per rotation of the planetary carrier 68 increases. Thus the ratio of the number of rotations of the contact rollers 78 (about the axes 82) per rotation of the planetary carrier 68 increases. On the other hand, as the radial distance from the center to the contact points decreases, the ratio of the contact roller rotations per rotation of the planetary carrier 68 decreases. Thus, the smaller the radial distance from the carrier axis of rotation to the points where the rollers contact the races, the slower the contact rollers 78 rotate.

The operator selects the radial distance from the center to the roller contact points by adjusting the axial positions of the races 86, 88 to change the rollers' points of contact with the tapered faces of the races. As the races 86, 88 are moved axially closer together, the rollers 78 "ride up" the tapered faces, thereby reducing the radial distance from the apparatus center to the points of engagement. Consequently, the operator can deliberately move the races 86, 88 to cause the contact rollers 78 to rotate faster or slower, which in turn modifies (via moon and drive gears 74, 76) the planetary rotation speed of the output gears 72.

The rotational speed of a planetary output gear 72 is directly proportional to the rotational speed of the associated planetary contact roller 78 (through the gear ratio of the planetary moon gear 74 and the planetary input gear 76). As a result, the rotation speed of the planetary output gear 72 can be independently controlled to be faster than or slower than the free rotational speed described above. In operation, of course, all the output gears 72 rotate at the same planetary rotation speed. Rotation of planetary output gears 72 imparts torque to the output shaft 60 via the sun gear 66. When the planetary rotational speed of the planetary output gears 72 is retarded to be less than the free rotation speed, the rotation of the output shaft 60 is in the same direction as that of the input shaft 90; i.e., the output speed $w_o$, and the input speed $w_i$ have the same algebraic sign. When the planetary rotational speed of the output gears 72 is greater than the free rotational speed, the rotation of the output shaft 60 is opposite in direction to the input shaft 90; i.e., the output rotation speed $w_o$, and input rotation speed $w_i$, are opposite in algebraic sign. By adjusting the planetary rotation speed of the planetary output gears 72, therefore, the operator is able to control both the speed and direction of rotation of the output shaft 60. By selectively moving the races 86, 88 progressively closer together, for example, the operator can continuously increase the planetary rotation speed of the output gears 72 from a speed less than the free rotation speed (whereby the output rotation is in the same direction as the input rotation), to and through a neutral condition (output rotation speed at or approaching zero), and then into a reverse condition where the output rotation is directionally opposite the input direction (i.e. the planetary rotation speed of the output gears 72 exceeds the free rotation speed). Advantageously, this is accomplished infinitely, rather than incrementally, and without any need to disengage the prime mover from the input shaft 90 or otherwise provide a clutched interruption of power.

Similarly to the first described embodiment, power transfer from the planetary output gears 72 is via the sun gear 66 to the output shaft 60.

When the output speed is very near zero, the torque output from the transmission output shaft 60 is very high (approaching an infinite value) since the power transfer is preserved less the small loss in the gears of this split race swing arm embodiment. Due to this feature, the compact split race swing arm embodiment is ideally suited for commercial applications requiring high starting torques, such as in conveyors, cranes, hoists, construction equipment and agricultural equipment. With this embodiment, the prime mover can be brought up to the most efficient operating speed with no torque applied to it while the output speed of the inventive transmission apparatus is controlled to zero. Once the prime mover is at it most efficient operating speed, it can be maintained at that speed as this compact split race swing arm transmission is slowly moved to either a small positive or negative output speed. Reducing starting torques can provide significant energy savings through employment of much smaller motors.

Figure 10:
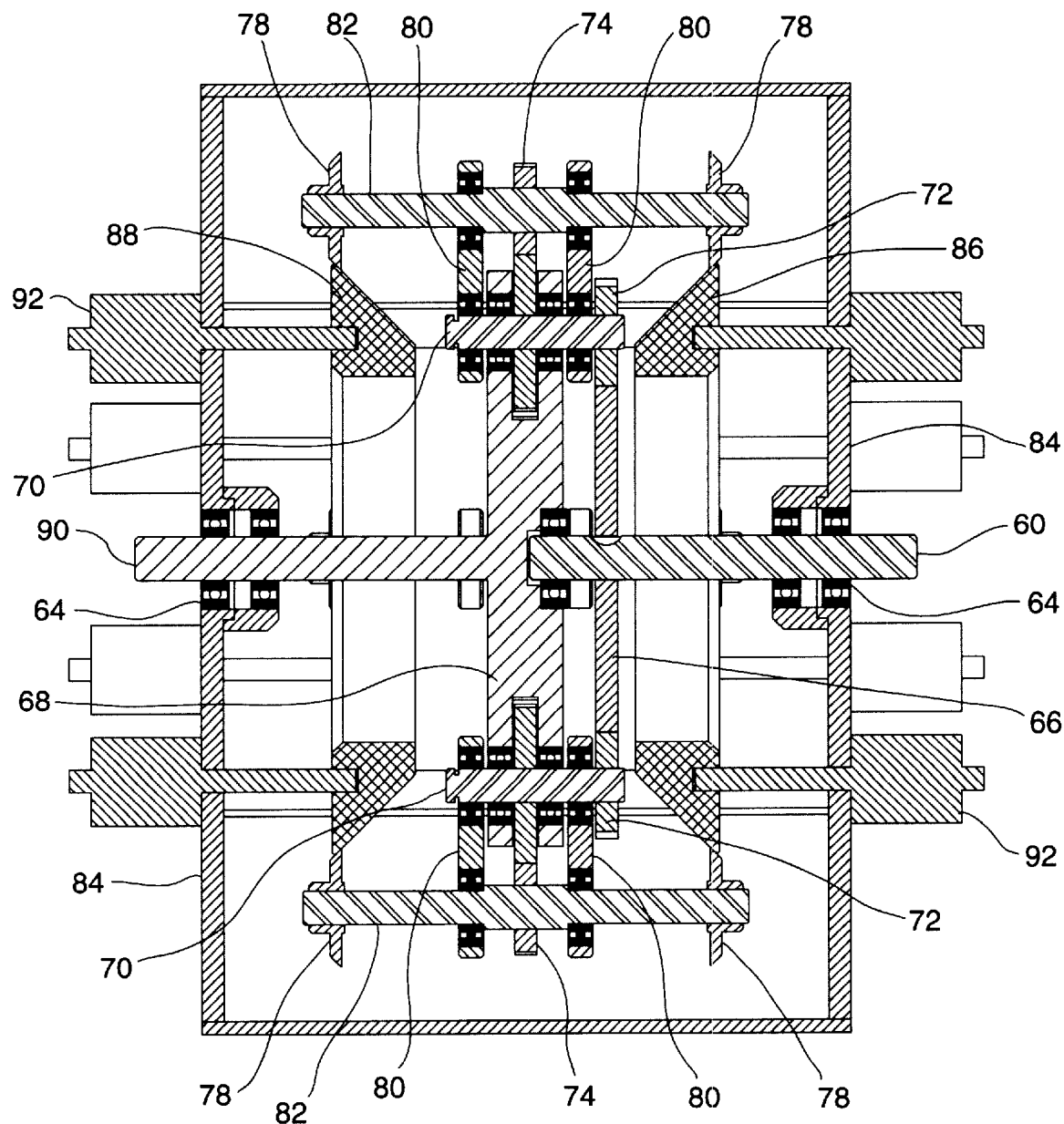
FIG. 10 is a side sectional view of a variation of the embodiment depicted in FIG. 7, showing the tapered races situated radially interiorly to the contact rollers as a space-saving measure.

A variation of this alternative embodiment is the split race swing arm apparatus shown in FIG. 10. The variant depicted in FIG. 10 functions in substantially the same manner as the embodiment of FIGS. 7–9, except that the tapered surfaces of the split races 86 and 88 are inverted (compared to the embodiment of FIG. 7), the planetary contact rollers 78 are moved outboard of the swing arms 80, and the contact between the planetary contact rollers 78 and a respective tapered race 86 or 88 is radially internal of the associated planetary moon axle 82. This radially inverted variant provides for a decrease in the overall diameter of the inventive apparatus, which may be important for certain applications.

Governing Equations

In each of the following expressions $D_{xx}$ is the pitch diameter of each specific xx gear or roller. The radial distance from the central axis of the planetary carrier 68 to the center of the planetary axle 70 is designated $R_{20}$. The radial distance from the common central axis of the planetary carrier 68 and output sun gear 66 to the point of engagement between each of the planetary contact rollers 78 and the respective split control race 86 or 88 is designated $R_{42}$.

$$w_o = w_i - (D_{72}/D_{66})w_4 \quad (6)$$

$$w_3 = -(2R_{42}/D_{78})w_i \quad (7)$$

$$w_4 = -(D_{74}/D_{76})w_3 \quad (8)$$

Substituting the expression for $w_3$ from equation 7 into equation 8 yields the desired relationship between the rotational speed $w_4$ of the planetary output gears 72 with respect to the input speed $w_i$.

$$w_4 = (D_{74}/D_{76})(2R_{42}/D_{78})w_i \quad (9)$$

Entering the expression for $w_4$ from equation 9 into equation 6, and rearranging terms yields the governing relationship between the input speed $w_i$ and the output speed $w_o$, $$w_o/w_i = 1 - gc\, R_{42} \quad (10)$$

Where:

$g = 2D_{72}/(D_{66}D_{78})$ and $c = (D_{74}/D_{76})$

The term $R_{42}$ the only control variable. By properly choosing the pitch diameter of each of the gears and the rollers, it is clear that the output speed $w_o$ can be set to zero when $gcR_{42} = 1$ i.e., an infinite gear ratio Following is an example of a combination of gears and contact point radius such that the output speed can be positive (same direction of the input rotation), neutral (zero output speed), or negative (output direction is reverse of the input direction). One is not free to arbitrarily choose the gear ratios because certain physical constraining relationships must be observed. These constraints are:

$$R_{42\,max} < (D_{66}/2) + (D_{72}/2) + (D_{76}/2) + (D_{74}/2) + (D_{78}/2) \quad (11)$$

$$R_{42\,min} > (D_{66}/2) + (D_{72}/2) + (D_{76}/2) \quad (12)$$

The following gear ratios (arbitrary dimensionless diameter units) satisfy the physical constraints.

$D_{78} = 2.40$ $D_{72} = 1.00$ $D_{66} = 3.00$ $D_{74} = 2.00$ $D_{76} = 2.50$

Which yields:

$g = 0.2778$ and $c = 0.80$

Designing the control ring such that the following radii for the control point is achieved yield the following results.

When $R_{42} = 3.60$, then $w_o/w_i = 0.2008$

When $R_{42} = 4.50$, then $w_o/w_i = 0.00$ i.e., and infinite gear ratio

When $R_{42} = 5.40$, then $w_o/w_i = -0.1988$ (Output rotational direction is opposite to the input).

The tangential interface shear resultant $T_s$ between the planetary contract rollers 78 and the split races 86 and 88, and creates the drive moment on the planetary contact rollers 78, is related to the output torque $T_o$ and the number of planetary elements n as:

$T_s = (gc\, T_o)/n$

Hence the split race swing arm embodiment can be adapted to provide any level of shear resultant reasonable for the imposed normal force and mating material properties. As the output torque $T_o$ of an application increases, the transmission is increased in diametral extent to accommodate more planetary gear sets.

Figure 11:
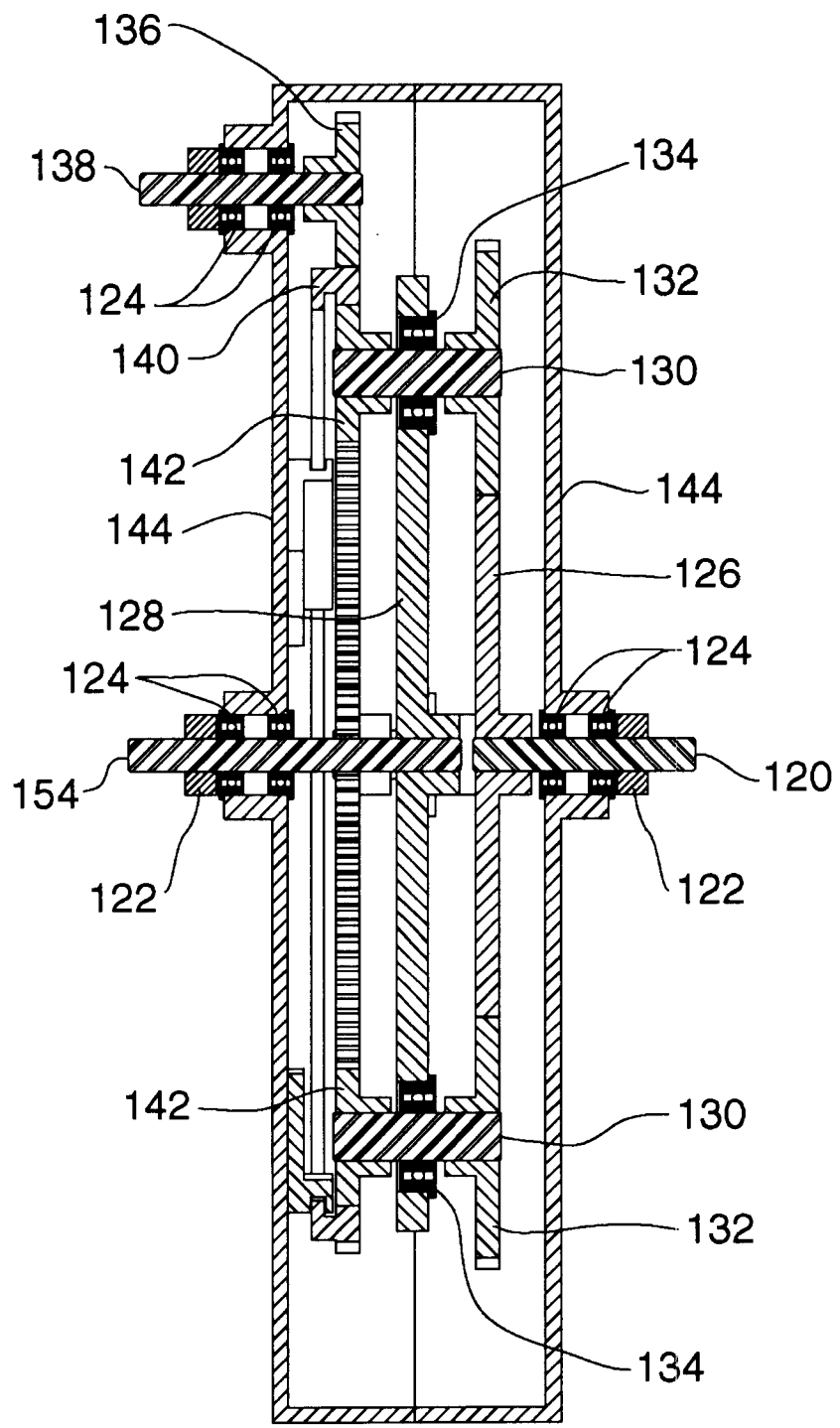
FIG. 11 is a side section view of a third embodiment of the invention, showing the use of dual input shafts.

Attention is invited to FIG. 11, showing a third embodiment of the invention. This embodiment functions somewhat similarly to the first embodiment described above, but is a dual input transmission. This third embodiment is designed to accommodate the input of two prime movers while allowing the output speed to be controlled to be forward, neutral or reversed from the direction of the prime movers. The embodiment can be adapted such that the rotational direction of both or either of the prime movers remains constant, although the rotational direction of one of the prime movers may be opposite that of the other. The rotational speed of one of the prime movers may be constant, with the output rotation speed controlled by the speed of the other prime mover; however, for certain applications, the rotational speed of both of the prime movers may be variable.

While many applications are envisioned for this embodiment, some of the best suited include hybrid electric vehicles where both electric and fossil powered engines are used to propel the vehicle. This embodiment of the transmission may be an ideal control component for systems where the primary power source is a gas turbine engine which operates most efficiently as a fixed speed, but where the output speed must be rapidly varied. Because of the cost of known speed control systems to deal with this type of application, gas turbines typically are currently disregarded. The present invention can, therefore, permit an electric generator to be mounted with the gas turbine to supply electricity to an electric motor to function as the second prime mover for the system. While functioning similarly to the hybrid vehicle system (i.e. two prime movers are used which are powered by different "fuels"), the gas turbine application employs only one prime mover; the dual input epicyclic transmission serves as a primary as low cost, control element with sufficient bandwidth via the rapid rate of speed change of the electric motor to control the rapidly changing output speed. Thus, this embodiment opens areas of use for gas turbine engines previously thought to be impractical due to the cost of the control elements.

As with the previously described embodiments, the dual input epicyclic embodiment is designed to be dimensionally very compact, can accommodate very high power requirements, and can be designed such that the major components are contained in a sealed case. A closed case is capable of being filled with a lubricating fluid, thus reducing friction losses, and extending component life.

As is shown in FIG. 11, the dual epicyclic embodiment includes a principal input shaft 154 supported in the transmission case 144 by bearings 124, secured by collars 122, and upon which the planetary carrier 128 is rotationally fixed. The planetary carrier 128 carries a plurality of planetary gear sets equianglularly spaced thereon, and rotates at input rotational speed of $w_{i1}$. Multiple (three, four, or more) planetary gear sets may be mounted to the carrier depending on the speed, diametrical dimensional constraints, and power levels demanded.

The first input shaft 154 and the second input shaft 138 are rotatable at first and second input rotation speeds, respectively, and the output shaft 120 is rotatable at an output rotation speed. The planetary carrier 128 is mounted upon the first input shaft, with the secondary input gear 136 fixedly disposed upon the second input shaft 138. As in other embodiments, the sun gear 126 is disposed upon the output shaft 120. The plurality of output planetary gears 132 are rotatably mounted upon the planetary carrier 128 to rotate at a planetary rotation speed relative to the carrier. The output planetary gears 132 are engageable with the sun gear 126. The plurality of planetary input gears 142 are rotatably mounted upon the planetary carrier 128 and are operably connected to the output planetary gears to rotate with said output planetary gears 132 The ring gear 140 is rotatable in either direction about the central axis of the apparatus, and is simultaneously engageable with the secondary input gear 136 and the input planetary gears 142, so that torque is transferred from the secondary input gear to the input planetary gears 142. Accordingly, the first input shaft 154 imparts torque to the planetary carrier 128, whose rotation causes input planetary gears 142 to revolve about the central axis, and the second input shaft 138 imparts torque to the secondary input gear 136. Consequently, the transfer of rotary force from the secondary input gear 136 to the input planetary gears 142 causes the input planetary gear to rotate, which in turn rotates the output planetary gears 132 at the planetary rotational speed.

Each planetary gear set includes an output planetary gear 132 and input planetary gear 142, both rigidly attached to a planetary axle 130 supported in the planetary carrier 128 by bearing 134. Because the planetary output gear 132 and planetary input gear are rotationally fixed upon the common planetary axle 130, they must rotate at the same planetary rotational speed.

The planetary output gears 130 mesh with and engage the output sun gear 126. Sun gear 126 is rigidly mounted upon the output shaft 120, which in turn is supported in the transmission case 144 by bearings 120 and secured by collars 122. A ring gear 140 meshes the input gear 142 of each planetary gear set with the secondary input gear 136, thereby operably engaging the secondary input gear 36 with the input planetary gears 142. Secondary input gear 136 is rigidly attached to the secondary input shaft 138 rotating at the control input speed $W_{i2}$. The secondary rotary input, combined with the ring gear 140, serve as the speed control input components of the apparatus. One of the prime movers, probably the principal power source, is attached to the input shaft 144 while the other or auxiliary variable speed prime mover is attached to the secondary input shaft 138 and drives the ring gear 140 meshed with the input planetary gears 142 at varying rotational speeds.

Adjusting the second input rotation speed modifies the rotation speed of the input planetary gears 142, which modifies the planetary rotation speed, thereby changing the output rotation speed. Changes in the second input rotation speed maybe accompanied by a reversal in the direction of rotation of the ring gear 140, depending upon the ratio between the first input rotation speed of first input shaft 154 and the second input rotation speed of the second input shaft 138. The second input rotation speed, therefore, is adjustable to cause the output rotation speed to be opposite from the first, input rotation speed.

Governing Equations

In each of the following expressions $D_{xx}$ is the pitch diameter of each specific xx gear. The rotational terms are: $w_{i1}$ is the rotational speed of the input shaft 144, $w_{i2}$ is the rotational speed of the secondary input shaft 138. $w_4$ is the rotational speed of the planetary shaft 130, while $w_3$ is the rotational speed of the ring gear 140.

$$w_o = w_{i1} - (D_{132}/D_{126})w_4 \qquad 13)$$

$$w_4 = (D_{140}D_{142})w_3 \qquad 14)$$

$$w_3 = -(D_{136}/D_{140})_{i2} \qquad 15)$$

Substituting equation 15 into equation 14 yields $$w_4 = -(D_{136}D_{142})w_{i2} \qquad 16)$$

Substituting equation 16 into equation 13 yields the governing equation relating the output rotational speed to the two input rotational speeds.

$$w_o = w_{i1} + (D_{132}D_{136})/(D_{126}D_{142})w_{i2} \qquad 17)$$

It is observed that when the rotation of one prime mover is opposite to that of the other, and when $$w_{i2} = (D_{126}D_{142})/(D_{132}D_{136})w_{i1}$$

the output rotational speed is zero. And when $$w_{i2} > (D_{126}D_{142})/(D_{132}D_{136})w_{i1}$$

the output is negative to the direction of the prime input $w_{i1}$. Also, because the ratio $(D_{126}D_{142})/(D_{132}D_{136})$ can be either much greater or much less than one, the relative speed of the two prime movers can greatly differ. If it is desired to have the rotational direction of both prime movers to be the same, and the capability to control the output speed to forward, neutral and reverse, the prime mover driving the ring gear may simply be mounted on the inside of the ring gear, yielding the required negative sign between the two input speeds.

INDUSTRIAL APPLICABILITY OF ALL EMBODIMENTS

A wide variety of applications exist for a compact high precise, moderate torque, "infinitely" variable speed control mechanism. Such applications include commercial precision chemical mixing apparatus, such as pharmaceuticals, explosives, etc. Because the apparatuses of the invention are capable or very low output speeds, either forward or reverse, with the output torque inversely proportional to the output speed, the invention can be designed into hoists and winches to provide a wide range of speeds while providing a capability to lift heavy objects slowly and provide very small movements during critical applications. Moreover, the invention may be retrofit or added to many current hoists and winches to provide smooth motions at high torque ranges without changing out the actual gearworks and drum of the hoists or winches.

Other applications where this device will save enormous amounts of energy is in the control of conveyor belts such as are used in construction, baggage handling, personnel movement, and the like.

Low speed electric transportation vehicles, such as those used in airports to transport passengers from one gate to another, require frequent starts and stops. The electric motors on these vehicles must be oversized in order to start under load. The disclosed invention allows for precise speed control of these vehicles while the electric motors run at a constant, most efficient speed.

Another transportation application is for speed control of bicycles. Current speed control on bicycles involves several sprockets and accompanying derailers to move the chain from one set to another. Such devices require constant adjustment and are often incapable of reaching a gear ratio that allows the rider to perform most efficiently. Because of its compact size and light weight, the disclosed device holds the potential of penetrating this substantial market rapidly by providing a constantly variable speed range where the rider can select a gear ration that best fits his/her needs.

The beltless embodiments of the invention are provide a high power transfer apparatus that can control the output speed. Some application areas for these devices include agricultural machinery, mining equipment, construction equipment, stationary wind power machines, and other stationary industrial application such as cranes and rim hoists.

Because they operate without slip, and use no compressible fluids as a power transfer media, the invention is a high efficiency transmission that can be produced at relatively low cost. As such, it has application potential in the commercial electric vehicle and hybrid electric vehicle market.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

We claim:

1. An infinitely variable transmission apparatus having a central axis and an input shaft rotatable at an input rotation speed and an output shaft rotatable at an output rotation speed, said apparatus characterized by:
    a planetary carrier mounted upon said input shaft;
    a sun gear mounted upon said output shaft;
    a plurality of input rotation members rotatably connected to said planetary carrier;
    a plurality of planetary gears rotatably connected to said planetary carrier;
    means for transferring torque from said planetary carrier to said input rotation members to cause said input rotation members to rotate in relation to said carrier, thereby to rotate said planetary gears at a planetary rotational speed, when said carrier is rotated by said input shaft,
    a plurality of planetary output rotation gears engageable with said sun gear, and rotatably mounted upon said planetary carrier to rotate at the planetary speed relative to said carrier;
    means for transferring torque from said input rotational members to corresponding ones of said planetary output gears; and
    means, comprising a variable geometry non-rotational member, for selectively modifying the rotational speed of said input rotational members by varying a radius of action;
wherein said input shaft imparts torque to said planetary carrier thereby to revolve said input rotation members about said central axis, and wherein modifying the rotation speed of said input rotation members modifies the planetary rotation speed, thereby changing the output rotation speed.

2. A continuously variable transmission apparatus having a central axis and an input shaft rotatable at an input rotation speed and an output shaft rotatable at an output rotation speed, said apparatus characterized by:
    a planetary carrier mounted upon said input shaft;
    a sun gear mounted upon said output shaft;
    a plurality of planetary gears rotatably mounted upon said planetary carrier to rotate at a planetary rotation speed relative to said planetary carrier, said planetary gears engageable with said sun gear;
    a plurality of planetary pulleys rotatably mounted upon said planetary carrier and operably connected to said planetary gears to rotate with said planetary gears;
    a rotationally fixed central pulley member having an adjustable effective diameter; and
    an endless belt having an inside surface and an outside surface and disposed in a serpentine configuration having said outside surface engaging said central pulley member and said inside surface engaging said planetary pulleys;
wherein said input shaft imparts torque to said planetary carrier thereby to revolve said planetary pulleys about said central axis, and the engagement of said inside surface of said belt with said planetary pulleys causes said planetary pulleys to rotate thereby to rotate said planetary gears at the planetary rotational speed, and wherein adjusting said effective diameter modifies the rotation speed of said planetary pulleys, which modifies the planetary rotation speed, thereby changing the output rotation speed.

3. An apparatus according to claim 2, wherein said apparatus is infinitely variable and characterized by said central pulley member is a variable pitch pulley having a pair of substantially parallel, rotationally fixed disks, a first one of said disks being selectively axially movable in relation to the second one of said disks.

4. An apparatus according to claim 2 characterized by said central pulley member is a segmented pulley comprising:
    a central hub;
    a plurality of movable peripheral pulley segments around said hub;
    a plurality of movable jointed arms pivotally connected to said hub and to said segments;
    a pair of regulating rings disposed about said hub and contactable with said arms for guiding movement of said arms and slidably engageable with said segments;
    a deployment sprocket disposed about said hub; and
    an adjustment chain deployed from said hub and engageable with said deployment sprocket;
and further characterized by said endless belt is an endless linked chain engageable with said adjustment chain, and said segments are movable to adjust incrementally the length of said adjustment chain engageable with said endless linked chain.

5. An apparatus according to claim 2 characterized by the effective diameter of said central pulley member is adjustable to cause said output rotation speed to be opposite said input rotation speed.

6. An infinitely variable transmission apparatus having a central axis and at least one input shaft rotatable at an input rotation speed and an output shaft rotatable at an output rotation speed, said apparatus characterized by:
    a planetary carrier mounted upon said one input shaft;
    a sun gear mounted upon said output shaft;
    at least one race, all said races rotationally fixed around said central axis;
    a plurality of contact rollers rotatably connected to said planetary carrier and engageable with said at least one race such that said rollers rotate in relation to said carrier when said carrier is rotated by said input shaft;
    means for selectively adjusting the radial distance from said central axis to the points of engagement between said contact rollers and said race;
    a plurality of planetary output gears rotatably mounted upon said planetary carrier to rotate at a planetary rotation speed relative to said carrier, said output gears engageable with said sun gear; and
    means for transferring torque from said contact rollers to said output gears;
wherein said input shaft imparts torque to said planetary carrier thereby to revolve said contact rollers about said central axis, and the engagement of said contact rollers with said at least one race causes said rollers to rotate thereby to rotate said output gears at the planetary rotational speed, and wherein adjusting said radial distance modifies the rotation speed of said contact rollers, which modifies the planetary rotation speed, thereby changing the output rotation speed.

7. An apparatus according to claim 6 characterized by said means for selectively adjusting comprises:

a tapered inner face on said at least one race, engageable with at least one of said contact rollers;

swing arms connecting said contact rollers to said planetary carrier, said swing arms mounted upon said planetary carrier for pivotal radial movement in relation to said central axis and radially biased to press said contact rollers against said tapered face; and means for axially moving said at least one race to shift the points of engagement between said contact rollers and said tapered face.

8. An apparatus according to claim 6 characterized by said radial distance is adjustable to cause said output rotation speed to be opposite said input rotation speed.

9. An infinitely variable, dual input transmission apparatus having a central axis and a first input shaft and a second, independently powered, input shaft rotatable at first and second input rotation speeds, respectively, and an output shaft rotatable at an output rotation speed, said input shafts driven by separate prime movers, said apparatus characterized by:

a planetary carrier mounted upon said first input shaft;

a secondary input gear mounted upon said second input shaft;

a sun gear mounted upon said output shaft;

a plurality of output planetary gears rotatably mounted upon said planetary carrier to rotate at a planetary rotation speed relative to said planetary carrier, said output planetary gears engageable with said sun gear;

a plurality of input planetary gears rotatably mounted upon said planetary carrier and operably connected to said output planetary gears to rotate with said output planetary gears; and a ring gear rotatable about the central axis and simultaneously engageable with said secondary input gear and said input planetary gears, whereby torque is transferred from said secondary input gear to said input planetary gears;

wherein said first input shaft imparts torque to said planetary carrier thereby to revolve said input planetary gears about said central axis, and said second input shaft imparts torque to said secondary input gear, and wherein the transfer of torque from said secondary input gear to said input planetary gears causes said planetary gears to rotate thereby to rotate said output planetary gears at the planetary rotational speed, and wherein adjusting said second input rotation speed modifies the rotation speed of said input planetary gears, which modifies the planetary rotation speed, thereby changing the output rotation speed.

10. An apparatus according to claim 9 characterized by said second input rotation speed is adjustable to cause said output rotation speed to be opposite said first input rotation speed.

* * * * *